United States Patent
Yamasaki et al.

(10) Patent No.: US 6,936,399 B2
(45) Date of Patent: *Aug. 30, 2005

(54) HYDROPHILIC MEMBER, HYDROPHILIC GRAFT POLYMER, AND SUPPORT OF PLANOGRAPHIC PRINTING PLATE

(75) Inventors: Sumiaki Yamasaki, Shizuoka-ken (JP); Koichi Kawamura, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 49 days.

This patent is subject to a terminal disclaimer.

(21) Appl. No.: 10/277,092

(22) Filed: Oct. 22, 2002

(65) Prior Publication Data

US 2003/0118849 A1 Jun. 26, 2003

(30) Foreign Application Priority Data

Oct. 22, 2001 (JP) ........................................ 2001-323873
Oct. 22, 2001 (JP) ........................................ 2001-323874

(51) Int. Cl.⁷ ................................................. G03F 7/09
(52) U.S. Cl. ............................... 430/270.1; 430/271.1; 430/272.1
(58) Field of Search .......................... 430/270.1, 271.1, 430/272.1

(56) References Cited

U.S. PATENT DOCUMENTS

| | | |
|---|---|---|
| 5,914,211 A | 6/1999 | Hashino et al. |
| 5,962,188 A | 10/1999 | DeBoer et al. |
| 6,014,930 A | 1/2000 | Burberry et al. |
| 6,672,210 B2 * | 1/2004 | Kawamura et al. .......... 101/457 |
| 2002/0134266 A1 * | 9/2002 | Yamasaki et al. ............ 101/453 |
| 2003/0118849 A1 * | 6/2003 | Yamasaki et al. ............ 428/447 |
| 2003/0143407 A1 * | 7/2003 | Yamasaki et al. ............ 428/447 |
| 2003/0170566 A1 * | 9/2003 | Yamasaki et al. ......... 430/272.1 |
| 2003/0186057 A1 | 10/2003 | Oohashi et al. |
| 2004/0060465 A1 * | 4/2004 | Yamasaki et al. ............ 101/453 |

FOREIGN PATENT DOCUMENTS

| | | | |
|---|---|---|---|
| EP | 0709228 A1 | 5/1996 | |
| EP | 0 903 224 A2 | 3/1999 | |
| EP | 0 938 972 A1 | 9/1999 | |
| EP | 0949088 A1 | 10/1999 | |
| EP | 1 057 622 A2 | 12/2000 | |
| EP | 1 088 679 A2 * | 4/2001 | ............ B41N/3/03 |
| EP | 1 172 696 A1 | 1/2002 | |
| EP | 1 211 096 A1 | 6/2002 | |
| EP | 1 226 976 A1 | 7/2002 | |
| JP | 59-101651 | 6/1984 | |
| JP | 07/001853 | 1/1995 | |
| JP | 8/507727 | 8/1996 | |
| JP | 96/00733 | 9/1996 | |
| JP | 08/272087 | 10/1996 | |
| JP | 08/292558 | 11/1996 | |
| JP | 2001-213062 A | 8/2001 | |
| JP | 2001-315452 A | 11/2001 | |
| WO | WO 94/23954 A1 | 10/1994 | |

OTHER PUBLICATIONS

"Ame o shawa ni biru araeru", ("Cleaning building using rain as a shower"), Kagaku kogyo nippo (The Chemical Daily), Jan. 30, 1995, p. 1.

* cited by examiner

Primary Examiner—Barbara L. Gilliam
(74) Attorney, Agent, or Firm—Sughrue Mion, PLLC

(57) ABSTRACT

The invention provides a hydrophilic member and a support for a planographic printing plate with a hydrophilic surface having hydrophilic graft chains and a cross-linked structure on a substrate surface formed by hydrolysis of an alkoxide of a metal selected from Si, Ti, Zr, and Al and condensation polymerization and it is characteristic that the hydrophilic surface contains a hydrophilic graft polymer, which is a copolymer of a macromer having hydrophilic functional groups and a structural unit having a silane coupling group.

Further, the invention provides a hydrophilic graft polymer that is copolymer of macromers having hydrophilic functional groups and structural units having silane coupling groups.

15 Claims, No Drawings

HYDROPHILIC MEMBER, HYDROPHILIC GRAFT POLYMER, AND SUPPORT OF PLANOGRAPHIC PRINTING PLATE

BACKGROUND OF THE INVENTION

1. Field of the Invention

The present invention relates to a hydrophilic member, more particularly to a hydrophilic member provided with a surface layer excellent in durability and hydrophilicity and a hydrophilic graft polymer to be employed by the hydrophilic member. The invention also relates to a support for a planographic printing plate, particularly to a support for a planographic printing plate having a surface made highly hydrophilic and capable of forming an image with a high image quality.

2. Description of the Related Art

Resin films have been used for a variety of purposes and their surfaces generally show hydrophobicity. Also, regarding inorganic materials such as glass, metals and the like, those showing high hydrophilicity are few.

When the surface of a substrate employing such as a resin film, an inorganic material, or the like, is made hydrophilic, water droplets adhering to the surface are evenly spread on the substrate surface and form a uniform water film, so that fogging of glass, lens, and mirrors can be efficiently prevented and accordingly it is useful to prevent devitrification due to moisture and to assure a visible field at the time of rainy weather. Further, city soot and dust, combustion products such as carbon black and the like contained in an exhaust gas of automobiles and the like, and hydrophobic pollutants such as fats and oils, sealant eluting components and the like hardly adhere to the hydrophilic surface and even if these materials adhere thereto, they can be easily washed off by rainfall and washing water and therefore, it is effective to make the surface hydrophilic for a variety of purposes.

A conventionally proposed surface treatment method for making the surface hydrophilic, for example, an etching treatment, a plasma treatment and the like, can made the surface highly hydrophilic, however the effect is temporary and the hydrophilic state cannot be kept for a long period of time.

A surface-hydrophilic coating using a hydrophilic polymer as one hydrophilic resins has also been proposed (Newspaper, "Kagaku Kogyo Nippo", Jan. 30, 1995). According to the report, although the coating has hydrophilicity to a certain degree, it cannot be said that the affinity with the substrate is sufficient and accordingly, further high durability is required.

Further, as another film with excellent surface hydrophilicity, a film using titanium oxide has been well-known conventionally. For example, in PCT/JP96/00733, it is disclosed that when a photolysis catalyst-containing layer is formed on the surface of a substrate, the surface is made highly hydrophilic depending on the photo-excitation of the photolysis catalyst and it is reported that if this technique is applied to a variety of composites such as glass, lens, mirrors, external materials, and members dealing with water, the composites are provided with excellent anti-fogging and anti-staining capability. However, such a hydrophilic film using titanium oxide does not have a sufficient film strength and consequently a hydrophilic material having higher wear resistance has been required.

Planographic printing is a printing method utilizing a plate material having an oleophilic region for receiving an ink and an ink-repelling region (a hydrophilic region) which does not receive an ink and receives dampening water. Recently, a photosensitive planographic printing plate precursor (PS plate) has been widely employed.

As the PS plate, those containing a support comprising, for example, an aluminum plate and a photosensitive layer formed thereon, have been realized and are widely used. Using such a PS plate, printing is carried out by removing the photosensitive layer in non-image areas by imagewise exposure and development and utilizing the hydrophilicity of the substrate surface and the oleophilicity of the photosensitive layer in the image areas. In order to prevent stains in the non-image areas of this plate material, high hydrophilicity is required for the substrate surface.

Conventionally, as a hydrophilic substrate to be employed for the planographic printing plate or a hydrophilic layer, an anodized aluminum substrate is used or silicate treatment of the anodized aluminum substrate is further carried out in order to improve the hydrophilicity. Further, investigations of a hydrophilic substrate using such an aluminum support or a hydrophilic layer have been enthusiastically performed and, for example, Japanese Patent Application Laid-Open (JP-A) No. 7-1853 discloses a technique using a substrate treated with an undercoating agent of a polyvinylphosphonic acid and JP-A No. 59-101651 discloses a technique using a polymer having a sulfonic group as an undercoating layer of a photosensitive layer and in other examples, techniques using polyvinylbenzoic acid and the like for undercoating agents have been proposed.

Further, regarding a photosensitive layer used when a flexible support of such as PET (polyethylene phthalate), cellulose acetate and the like is used without using a metal support of such as aluminum, the following various techniques have been proposed: a dampened hydrophilic layer composed of a hydrophilic polymer and a hydrophobic polymer and described in JP-A No. 8-292558, a PET support having a microporous hydrophilic cross-linking silicate surface and described in EP 0,709,228, a hydrophilic layer containing a hydrophilic polymer and cured with hydrolyzed tetraalkyl orthosilicate and described in JP-A Nos. 8-272087 and 8-507727, and the like.

These hydrophilic layers have improved hydrophilicity as compared with a conventional layer to provide a planographic printing plate capable of providing printings which are free of stains at the time of starting printing, however they still have a problem that they peel off after repeated printing and hydrophilicity is decreased over time. Accordingly, it is required to obtain a support for planographic printing plate whose hydrophilic layer does not separate from the support and keeps surface hydrophilicity well without deterioration and which is capable of providing a large number of printings without stains even under severe printing conditions. Presently, further hydrophilicity improvement is also required in terms of practical application.

SUMMARY OF THE INVENTION

A purpose of the present invention is to provide hydrophilic members comprising a variety of substrates having excellent surface hydrophilicity and surface-hydrophilic layers with excellent durability thereon and to provide hydrophilic graft polymers preferably usable for them. Further, the other purpose of the invention is to provide a support for planographic printing plate especially improved in durability to printing stains owing to the hydrophilic surface and capable of providing a large number of high quality printings even under strict printing conditions.

In order to achieve the above-described purposes, inventors of the invention have found as a result of the investigations performed focusing on the characteristics of hydrophilic graft polymers that the above-described purposes can be achieved by forming a surface layer having a cross-linked structure formed by hydrolysis and condensation polymerization of a hydrophilic graft polymer composed of a hydrophilic polymer and a silane coupling group introduced thereinto and a metal alkoxide and also found that, in order to form a cross-linked structure, a hydrophilic polymer into which a silane coupling agent is introduced is useful and accordingly have completed the invention.

That is, the hydrophilic member and the support for a planographic printing plate of the invention is a hydrophilic member for use with a base material including a surface, the member comprising:

a hydrophilic surface disposed on the base material surface and including a hydrophilic graft chains and a cross-linked structure formed by hydrolysis and condensation polymerization of an alkoxide of a metal selected from Si, Ti, Zr, and Al; wherein, the hydrophilic surface includes a hydrophilic graft polymer, which is a copolymer of a macromer including a hydrophilic functional group and a structural unit having a silane coupling group.

The hydrophilic graft polymer of the invention is characterized in that the polymer is copolymer of macromers having hydrophilic functional groups and structural units having silane coupling groups.

The action of the invention is not so clear, however the hydrophilic surface having hydrophilic graft chains and a cross-linked structure formed by hydrolysis and condensation polymerization of an alkoxide of a metal selected from Si, Ti, Zr, and Al becomes a coating with a high strength and high hydrophilicity since the hydrophilic functional groups introduced in form of graft chains unevenly exist in free state and an organic and inorganic composite coating film having a highly densified cross-linked structure is formed by hydrolysis and condensation polymerization of the metal alkoxide.

Particularly, as a hydrophilic polymer, a hydrophilic graft polymer, a copolymer of a macromer having hydrophilic functional groups and a structural unit having a silane coupling group is dissolved in a proper solvent and stirred to promote hydrolysis and condensation polymerization in the system and obtain a sol-state hydrophilic coating solution composition and the solution is applied to a substrate and dried to form an organic and inorganic composite coating on the substrate which contains hydrophilic functional groups unevenly existing on the surface in free state and has a highly densified cross-linked structure formed by reactions of a plurality of silane coupling groups located in the side chains. Further, it is supposed that addition of a hydrolyzed compound to the hydrophilic coating solution increases the reaction sites for forming cross-links by the polymerizable functional groups in the hydrolyzable compound and a plurality of the silane coupling groups existing in the side chains and consequently, the organic and inorganic composite coating having a highly dense and firm cross-linked structure is formed and accordingly, the obtained hydrophilic surface coating is provided with further high strength and excellent wear resistance and is capable of retaining the high surface hydrophilicity for a long duration.

DESCRIPTION OF THE PREFERRED EMBODIMENTS

Hereinafter, the present invention will be described in details.

A hydrophilic member and a support of a surface planographic printing plate of the invention are those provided with a hydrophilic surface (a hydrophilic layer) having hydrophilic graft chains and a cross-linked structure on a proper substrate formed by hydrolysis and condensation polymerization of an alkoxide of a metal selected from Si, Ti, Zr, and Al and such a hydrophilic surface having the cross-linked structure can be properly formed using compounds having the metal alkoxide structure and hydrophilic functional groups capable of forming hydrophilic graft chains. Among metal alkoxides, Si alkoxide is preferable to be used owing to the reactivity and the availability and specifically, a compound to be used for a silane coupling agent is preferable to be used.

The above-mentioned cross-linked structure formed by hydrolysis and condensation polymerization of such a metal alkoxide is referred to as a sol-gel cross-linked structure in some cases in the invention hereinafter.

At first, the hydrophilic graft chains will be described.

The hydrophilic surface having the cross-linked structure according to the invention can be produced by producing a hydrophilic graft polymer using a method generally well-known as a synthesis method of a graft polymer and cross-linking the obtained polymer by utilizing the sol-gel cross-linked structure formation process, which will be described in details later. The synthesis of the graft polymer is specifically described in "Graft polymer and its application" written by IDE Humio, issued in 1977 by Polymer Publisher Associate and "New Polymer Experiment II, Synthesis and Reaction of Polymer" editted by Polymer Society, Kyoritsu Shuppan Co., Ltd., 1995.

The synthesis of the graft polymer (in the invention, the hydrophilic graft polymer) can be produced basically by three methods; 1. polymerizing branch monomers from a main chain polymer; 2. bonding branch monomers to the main chain polymer; and 3. copolymerizing branch molecules to the main chain polymer (a macromer method).

Among these three methods, any method may be employed to form the hydrophilic surface of the invention, however the method, "3. Macromer method" is especially excellent from a viewpoint of production suitability and controllability of the film structure.

The synthesis of the graft polymer using a macromer is described in the above-mentioned, "New Polymer Experiment II, Synthesis and Reaction of Polymer" editted by Polymer Society, Kyoritsu Shuppan Co., Ltd., 1995. It is also described in details in "Chemistry and Industry of Macromonomer" written by YAMASHITA Yu, et. al, I.B.C, 1989. More specifically, using the following hydrophilic monomers such as acrylic acid, acrylamide, 2-acrylamido-2-methylpropanesulfonic acid, N-vinylacetamide, and the like exemplified below for the above-mentioned organic cross-linked hydrophilic layer, a hydrophilic macromer can be synthesized according to methods disclosed in journals.

Hydrophilic Monomer:

A hydrophilic monomer useful for forming a hydrophilic graft polymer is a monomer bearing positive charge such as ammonium, phosphonium, and the like and a monomer having an acidic group bearing negative charge or dissociable to negative charge such as sulfonic acid group, carboxyl, phosphoric acid group, phosphonic acid group, and the like and other than those, a hydrophilic monomer having a nonionic group such as hydroxyl, amido, sulfonamide group, alkoxy group, cyano group, and the like may be employed. In the invention, specific examples of especially useful hydrophilic monomers include the following monomers: monomers having carboxyl, sulfonic acid group, phosphoric acid group, amino group, and their salts such as (meth)acrylic acid, its alkali metal salts and amine salts; itaconic acid, its alkali metal salts and amine salts; allylamine and its halogenated hydroacid salts; 3-vinylpropionic acid, its alkali metal salts and amine salts; vinylsulfonic acid, its alkali metal salts and amine salts; vinylstyrenesulfonic acid, its alkali metal salts and amine salts; 2-sulfoethylene (meth)acrylate and 3-sulfopropylene (meth) acrylate, their alkali metal salts and amine salts; 2-acrylamido-2-methylpropanesulfonic acid, its alkali metal salts and amine salts; acid phosphoxypolyoxyethylene glycol mono(meth)acrylate, allylamine and their halogenated hydroacid salts and the like; and monomers having carboxyl, sulfonic acid group, phosphoric acid group, amino group, and their salts such as 2-trimethylaminoethyl (meth)acrylate and its halogenated hydroacid salts. Further, 2-hydroxyethyl (meth)acrylate, (meth)acrylamide, N-monomethyol (meth) acrylamide, N-dimethylol (meth)acrylamide, N-vinylpyrrolidone, N-vinylacetamide, allylamine and their halogenated hydroacid salts, polyoxyethylene glycol mono (meth)acrylate and the like are also useful.

Hydrophilic Macromer:

Those especially useful among hydrophilic macromers to be used for the invention are macromers derived from monomers containing carboxylic groups such as acrylic acid, methacrylic acid and the like; sulfonic acid-based macromers derived from monomers such as 2-acrylamido-2-methylpropanesulfonic acid, vinylstyrenesulfonic acid, and their salts; amide-based macromers such as acrylamide, methacrylamide and the like; amide-based macromers derived from N-vinylcarboxylic acid amide monomers such as N-vinylacetamide, N-vinylformamide and the like; macromers derived from hydroxy-containing monomers such as hydroxyethyl methacrylate, hydroxyethyl acrylate, glycerol monomethacrylate, and the like; and macromers derived from alkoxy- or ethylene oxide group-containing monomers such as methoxyethyl acrylate, methoxypolyethylene glycol acrylate, polyethylene glycol acrylate, and the like. Further, monomers having polyethylene glycol chains and polypropylene glycol chains are also usable as the macromers of the invention.

The molecular weight of those usable as the macromers is in a range from 400 to 100,000, preferably 1,000 to 50,000, and particularly preferably 1,500 to 20,000. If the molecular weight is 400 or less, no effect is caused and if it is 100,000 or higher, the polymerizability with a copolymerization monomer forming the main chain is inferior.

Further, it is required for the hydrophilic graft polymer of the invention to contain silane coupling groups and such a hydrophilic graft polymer can be obtained by copolymerizing the structural unit containing the silane coupling groups and the foregoing hydrophilic macromer. As the structural unit containing the silane coupling groups, hydrophilic monomers and macromers having silane coupling groups in the side chains or the terminals can be exemplified.

As the silane coupling groups to be introduced into, functional groups having the following general formula (I) can be exemplified.

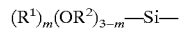

$(R^1)_m(OR^2)_{3-m}$—Si—            General formula (I):

In the foregoing general formula (I), each of $R^1$ and $R^2$ independently represents one of hydrogen atom and a hydrocarbon with no more than 8 carbon atoms. As the hydrocarbon group, an alkyl group and aryl group can be exemplified and a straight chain, a branched, or a cyclic alkyl with no more than 8 carbon atoms is preferable. Specifically, methyl, ethyl, propyl, butyl, pentyl, hexyl, heptyl, octyl, isopropyl, isobutyl, sec-butyl, tert-butyl, isopentyl, neopentyl, 1-methylbutyl, isohexyl, 2-ethylhexyl, 2-methylhexyl, cyclopentyl and the like can be exemplified.

$R^1$ and $R^2$ are preferably hydrogen atom, methyl or ethyl from the viewpoint of the effect and the availability.

The hydrophilic graft polymer according to the invention may further contain another hydrophilic monomer to be copolymerized other than the above-mentioned two structure units, that is, the macromer having hydrophilic functional groups and the structural unit having the silane coupling group. As the copolymerizable hydrophilic monomer, the hydrophilic monomers previously exemplified as the useful groups for forming the hydrophilic macromer can be exemplified and for examples, they are monomers having carboxyl, sulfonic acid group, phosphoric acid group, amino group, and their salts such as (meth)acrylic acid, its alkali metal salts and amine salts; itaconic acid, its alkali metal salts and amine salts; allylamine and its halogenated hydroacid salts; 3-vinylpropionic acid, its alkali metal salts and amine salts; vinylsulfonic acid, its alkali metal salts and amine salts; vinylstyrenesulfonic acid, its alkali metal salts and amine salts; 2-sulfoethylene (meth) acrylate and 3-sulfopropylene (meth)acrylate, their alkali metal salts and amine salts; 2-acrylamido-2-methylpropanesulfonic acid, its alkali metal salts and amine salts; acid phosphoxypolyoxyethylene glycol mono(meth) acrylate, allylamine and their halogenated hydroacid salts and the like; and monomers having carboxyl, sulfonic acid group, phosphoric acid group, amino group, and their salts such as 2-trimethylaminoethyl (meth)acrylate and its halogenated hydroacid salts; and further, 2-hydroxyethyl (meth) acrylate, (meth)acrylamide, N-monomethyol (meth) acrylamide, N-dimethylol (meth)acrylamide, N-vinylpyrrolidone, N-vinylacetamide, allylamine and their halogenated hydroacid salts, polyoxyethylene glycol mono (meth)acrylate and the like.

One method for producing the cross-linked hydrophilic layer into which the hydrophilic graft chains are introduced according to the invention after these hydrophilic macromers are synthesized is a method comprising steps of copolymerizing the above-mentioned hydrophilic macromer and another structural unit containing silane coupling groups to synthesize the graft-copolymerized polymer and then applying the synthesized graft-copolymerized polymer, carrying out the hydrolysis and applying the resulting product to a support, and carrying out cross-linking by the heat at the time of drying. In this case, a cross-linking agent is preferable to be introduced and owing to the introduction of the cross-linking agent, a hydrophilic layer with higher strength can be produced.

The hydrophilic graft polymer, the obtained copolymer of the macromer having the hydrophilic functional groups and the structural unit having the silane coupling groups, is an innovative polymer compound and since it contains a plurality of hydrophilic graft chains excellent in mobility and silane coupling groups, which are reaction sites for mutually reacting with the sol-gel cross-linked layer, in the molecule, the polymer is useful for forming the hydrophilic member of the invention.

Such a hydrophilic layer provided with the hydrophilic graft chains having the hydrophilic functional groups and the silane coupling groups and the sol-gel cross-linked structure can be easily formed by producing a hydrophilic coating solution composition containing, for example, hydrophilic graft polymer (hereinafter, referred to as a specified hydrophilic polymer in some cases), the copolymer containing the macromer having the hydrophilic functional groups and the structural unit having the silane coupling groups, preferably further containing a hydrolyzable compound having the following general formula (II) and then applying and drying the solution to form a film.

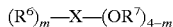

General formula (II):

In the formula (II), each of $R^6$ and $R^7$ independently represents one of an alkyl and an aryl; X represents one of Si, Al, Ti, and Zr; and m represents an integer from 0 to 2.

The hydrolyzable compound (hereinafter, simply referred to as a hydrolyzable compound in some cases) having the foregoing general formula (II) to be employed in this case is a hydrolyzable compound having polymerizable functional groups in the structure and exhibiting a function as a cross-linking agent and forms of a firm coating having a cross-linked structure by condensation polymerization of the foregoing specified hydrophilic polymer.

In the foregoing general formula (II), $R^6$ represents hydrogen atom, an alkyl, or an aryl and $R^7$ represents an (un) substituted alkyl or aryl; X represents Si, Al, Ti or Zr; and m represents an integer of 0 to 2.

In the case each of $R^6$ and $R^7$ independently represents an alkyl, the number of carbons is preferable to be 1 to 4. The alkyl or an aryl may have a substituent group and the substituent group to be introduced includes a halogen, an amino, a mercapto and the like.

Incidentally, the compound is a low molecular weight compound and preferable to have a molecular weight of 1,000 or lower.

Hereinafter, specific examples of the hydrolyzable compounds having the general formula (II) are as follows, however the invention is not limited to these examples.

In the case X is Si, that is, hydrolyzable compounds containing Si, are, for example, trimethoxysilane, triethoxysilane, tripropoxysilane, tetramethoxysilane, tetraethoxysilane, tetrapropoxysilane, methyltrimethoxysilane, ethyltriethoxysilane, propyltrimethoxysilane, methyltriethoxysilane, ethyltriethoxysilane, propyltriethoxysilane, dimethyldimethoxysilane, diethyldiethoxysilane, γ-chloropropyltriethoxysilane, γ-mercaptopropyltrimethoxysilane, γ-mercaptopropyltriethoxysilane, γ-aminopropyltriethoxysilane, phenyltrimethoxysilane, phenyltriethoxysilane, phenyltripropoxysialne, diphenyldimethoxysilane, diphenyldiethoxysilane and the like.

Among them, those particularly preferable are tetramethoxysilane, tetraethoxysilane, methyltolylmethoxysilane, ethyltrimethoxysilane, methyltriethoxysilane, ethyltriethoxysilane, dimethyldiethoxysilane, phenyltrimethoxsilane, phenyltriethoxysilane, diphenyldimethoxysilane, diphenyldiethoxysilane, and the like.

Further, in the case X is Al, that is, the hydrolyzable compounds containing aluminum, are, for example, trimethoxyaluminate, triethoxyaluminate, tripropoxyaluminate, tetraethoxyaluminate, and the like.

In the case X is Ti, that is, the compounds containing titanium, are, for example, trimethoxytitanate, tetramethoxytitanate, triethoxytitanate, tetraethoxytitanate, tetrapropoxytitanate, chlorotrimethoxtitanate, chlorotriethoxytitanate, ethyltrimethoxytitanate, methyltriethoxytitanate, ethyltriethoxytitanate, diethyldiethoxytitanate, phenyltrimethoxytitanate, phenyltriethoxytitanate, and the like.

In the case X is Zr, that is, the compounds containing zirconium, are, for example, zirconates corresponding to those compounds exemplified as the above-mentioned titanium-containing compounds.

Preparation of Hydrophilic Coating Solution:

In the case of producing a hydrophilic coating solution composition containing the above-mentioned specified hydrophilic polymer, the content of the specified hydrophilic polymer is preferable to be not less than 10% by weight and less than 50% by weight on the basis of solid matter. If the content exceeds 50% by weight, the film strength tend to be decreased and if it is less than 10% by weight, the probability of deterioration of the coating property and crack formation in the film is increased and accordingly both cases are not preferable.

Further, in the case a hydrolyzable compound is added for the preparation of a preferable hydrophilic coating solution composition, the addition amount of the hydrolyzable compound is preferable to adjust the polymerizable group in the hydrolyzable compound to be not less than 5% by mole and further not less than 10% by mole. The upper limit of the cross-linking agent addition amount is not particularly restricted if it is within a range in which cross-linking with a hydrophilic polymer is sufficiently carried out, however in the case of extremely excess addition, it is probable a problem that the produced hydrophilic member becomes sticky occurs owing to the cross-linking agent which is nothing to do with the cross-linking.

The hydrophilic polymer into which silane coupling group is introduced in the side chains, preferably further together with a hydrolyzable compound (a cross-linking agent) is dissolved in a solvent and stirred well and consequently, these components are hydrolyzed and condensation-polymerized to obtain an organic and inorganic composite sol solution which becomes a hydrophilic coating solution of the invention and accordingly, using the solution, a surface-hydrophilic layer with a high hydrophilicity and a high film strength can be formed In the production of the organic and inorganic composite sol solution, in order to promote the hydrolysis and the condensation polymerization reaction, an acidic catalyst or a basic catalyst is preferable to be used in combination and in the case a specifically preferable reaction efficiency is achieved, the catalyst is indispensable.

As the catalyst, an acidic or basic compound is used as it is or while being dissolved in a solvent such as water or an alcohol (hereinafter, referred to as an acidic catalyst and a basic catalyst, respectively). The concentration in the case of dissolution in a solvent is not particularly restricted and properly selected depending on the characteristics of the acid or the basic compound to be employed and the desired content of the catalyst, however in the case that the concentration is high, the hydrolysis and condensation polymerization speed tends to be fast. Nevertheless, if a basic catalyst with a high concentration is used, since precipitates are produced in the sol solution in some cases, the concentration is desired to be 1 N or lower on the basis of the concentration in the aqueous solution in the case the basic catalyst is used.

Although the types of the acidic catalyst or the basic catalyst are not particularly restricted, in the case a catalyst in a high concentration is needed to use, it is preferable to use a catalyst composed of elements which scarcely remain in the coating after drying.

Specifically, as an acidic catalyst, examples include a hydrogen halide such as hydrochloric acid, nitric acid, sulfuric acid, sulfurous acid, hydrogen sulfide, perchloric acid, hydrogen peroxide, carbonic acid, carboxylic acid such as formic acid and acetic acid, a substituted carboxylic acid of which R in the structural formula, RCOOH, is substituted with another element or a substituent, a sulfonic acid such as benzenesulfonic acid, and the like and as a basic catalyst, examples include ammonia-based base such as ammonia water, amines such as ethylamine, aniline and the like.

Preparation of the hydrophilic coating solution can be carried out by dissolving a hydrolyzable compound and a specified hydrophilic polymer into which silane coupling groups are introduced in the side chains in a solvent such as ethanol and adding the above-mentioned catalyst and stirring the resulting mixture. It is preferable that the reaction temperature is a room temperature to 80° C. and the reaction time, that is, the continuous time for stirring is within a range from 1 to 72 hours and hydrolysis and condensation polymerization of both components is promoted by the stirring to obtain the organic and inorganic composite sol solution.

As the solvent to be employed for production of the hydrophilic coating solution composition containing the above-mentioned specified hydrophilic polymer and preferably the hydrolyzable compound, those which are capable of dissolving and dispersing them evenly can be used without any particular restrictions, however, for example, a water-soluble solvent such as methanol, ethanol, water and the like.

As described above, a sol-gel method is utilized for the preparation of the organic and inorganic composite sol solution (the hydrophilic coating solution composition) for forming a hydrophilic layer of the invention. The sol-gel method is described in details in books such as "Science of Sol-Gel Method" SAKUHANA Sumio, Agune Shofusha Co., Ltd. 1988, "Functional Thin Film Production Technique by Latest Sol-Gel method" HIRAJIMA Tadami, Sogogijutsu Center, 1992 and the like and the methods described in these books can be employed for the preparation of the hydrophilic coating solution composition of the invention.

A variety of additives may be used for the hydrophilic coating solution composition of the invention depending on the purposes unless the effects of the invention are not disturbed. For example, in order to improve the evenness of the coating solution, a surfactant may be added.

The hydrophilic member and the support for a surface planographic printing plate of the invention can be obtained by applying the above-mentioned hydrophilic coating solution composition to a proper substrate and heating and drying the composition to form a surface-hydrophilic layer. Although the heating temperature and the heating time for formation of the hydrophilic layer are not particularly restricted if they are proper temperature and time to remove the solvent in the sol and form a firm coating, the heating temperature is preferable to be 200° C. or lower and the cross-linking time is within 1 hour in terms of the production suitability.

A substrate usable for the invention is, for example, a transparent substrate in the case an anti-fogging effect is expected and the material may be preferably glass, plastics and the like. The applications of a member having the anti-fogging effect include mirrors such as a vehicular rear-view mirror, a bath room mirror, a wash room mirror, a dental mirror, a road mirror and the like; lenses such as a lens of glasses, an optical lens, a camera lens, a lens of an endoscope, a lens for luminair, a lens for a semiconductor, a lens of a copying machine and the like; prisms; window glass of such as a building and a supervisory tower; window glass of a vehicle such as an automobile, a railway car, an aircraft, a ship, a submarine, a snow vehicle, a gondola of a ropeway, a gondola of an amusement park, a vehicle of such as a space craft; windowbreak glass of a vehicle such as an automobile, a railway car, an aircraft, a ship, a submarine, a snow vehicle, a snow mobile, an autobicycle, a gondola of a ropeway, a gondola of an amusement park, a vehicle of such as a space craft; glass for protective goggles, goggles for sports, a shield of a protective mask, a shield of a mask for sports, a shield for a helmet, a showcase for frozen food; cover glass of measuring machine, and a film to be stuck to the surface of the above-mentioned articles.

Further, in the case the surface cleaning effect is expected for the hydrophilic member and the support for a surface planographic printing plate, as the substrate, for example, a metal, a ceramic, glass, a plastic, wood, stone, cement, concrete, a fiber, a cloth, their combinations and laminates are all preferable to be used. The applications of a member having the surface cleaning effect include, for example, a construction material, a construction exterior material, a construction interior material, a window frame, window glass, a structural member, a vehicular exterior material and coating, an exterior material of machinery and articles, a dust-proof cover and coating, a traffic-control sign, a variety of display apparatuses, an advertisement tower, a sound-proof wall for a road, a sound-proof wall for a railway, a bridge, an exterior material and coating of a guardrail, an interior material and coating of a tunnel, an insulator, a solar cell cover, a heat collecting cover of a solar water heating apparatus, a vinyl green house, a cover of a vehicular lamp, a residential facility, a toilet stool, a bathtub, a washing sink, a luminair, a luminair cover, a kitchen utensil, a dish, a dish washer, a dish drier, a kitchen sink, a cooking microwave, a kitchen hood, a ventilation fan, and a film to be stuck to the surface of the above-mentioned articles.

In the case an anti-static effect is expected for the hydrophilic member and the support for a surface planographic printing plate of the invention, as materials to be employed as the substrate, for example, a metal, a ceramic, glass, a plastic, wood, stone, cement, concrete, a fiber, a cloth, their combinations and laminates are preferable.

The applications include a cathode-ray tube, a magnetic recording medium, an optical recording medium, an opto-magnetic recording medium, an audio tape, a video tape, an analog record, a housing, a part, an exterior material and a coating of electric products for domestic use, a housing, a part, an exterior material and a coating of an OA appliances, a construction material, a construction exterior material, a construction interior material, a window frame, window glass, a structural member, a vehicular exterior material and coating, an exterior material of machinery and articles, a dust-proof cover and coating, and a film to be stuck to the surface of the above-mentioned articles.

As the substrate, both inorganic substrates of such as glass and ceramics and substrates having surface of polymer resin are preferable to be employed and a resin substrate includes any of resin itself, a substrate coated with resin in the surface, and a composite material bearing a resin layer as a surface layer.

As the resin itself, a film substrate such as a scattering-preventing film, a designed film, a corrosion resistant film and the like and a resin substrate of an advertisement board, a sound-proof wall of a high way and the like can be exemplified. As the substrate coated with resin in the surface, an automotive box body, a coated plate such as a coated construction material and the like, a laminate plate comprising a resin film stuck to the surface, a primer-treated substrate, a substrate subjected to hard coat treatment can be exemplified.

As the composite material comprising a resin layer as the surface layer, a resin seal material bearing an adhesive layer in the rear face, a reflection mirror and the like can be exemplified.

The excellent hydrophilicity in the invention means the state that the water-wettability is 10° or less on the basis of the contact angle with water. As disclosed in PCT/JP 96/00733, if the member surface has water-wettability of 10° or less on the basis of the contact angle with water, even if moisture and steam in air are condensed, the condensate water does not form respective droplets but significantly tends to form an even water film. Well-known methods can be employed for the measurement method of the contact angle and a method for measuring a contact angle (droplets in air) using a commercialized apparatus (e.g. trade name CA-Z: manufactured by Kyowa Interface Science Co., Ltd.) may be applied. In the case the expanded wettability is found by this method, it can be determined that preferable hydrophilicity of the invention is achieved.

Image Forming Layer:

A planographic printing plate precursor can be obtained by forming an image forming layer on the support for a surface planographic printing plate of the invention.

The image forming layer to be applied for the support for a surface planographic printing plate of the invention is not particularly restricted and a conventional PS plate and a positive type or negative type photosensitive image forming layer well-known in photo-resist field may be used properly.

The image forming layer to be applied for the support for a surface planographic printing plate of the invention is not particularly restricted and a conventional PS plate and a positive type or negative type photosensitive image forming layer well-known in photo-resist field may be used properly.

In the invention, the image forming layer (a photosensitive layer or a heat sensitive layer) to be formed on the hydrophilic surface contains a positively reacting sensitive composition or a negatively reacting sensitive composition.

Positively Reacting Sensitive Composition:

As the positively reacting sensitive composition to be employed for the invention, the following conventionally well-known positively reacting sensitive compositions [(a) to (d)] can be exemplified to be preferable.

(a) A conventional and positively reacting sensitive composition which contains naphthoquinonediazide and novolak resin and has been conventionally used;

(b) A laser sensitive positive composition which contains a water-insoluble and an alkali-soluble polymer compound and a photothermal conversion agent and whose solubility in an aqueous alkaline solution is increased by light or heat;

(c) A laser sensitive positive composition which contains a thermally decomposable sulfonic acid ester polymer or an acid-decomposable carboxylic acid ester polymer together with an IR absorbent; and (d) A chemically amplified and positively reacting sensitive composition which contains an alkali-soluble compound protected with an acid-decomposable group and an acid generating agent.

The compounds to be employed for the positively reacting sensitive compositions described in the foregoing (a) to (d) will be described below.

As preferable quinonediazide compounds for (a) the conventional and positively reacting sensitive composition which contains naphthoquinonediazide and novolak resin and has been conventionally used, o-quinonediazide compounds may be exemplified.

The o-quinonediazide compounds to be employed for the invention are compounds having at least one o-quinonediazide compound and whose alkali-solubility is increased by thermal decomposition and those with a variety of structures can be employed. That is, o-quinonediazide assists the solubility of a sensitive material system based on both effects that the solubility suppressing capability of the alkali-soluble compound is lost and that o-quinonediazide itself is converted into an alkali-soluble substance. As o-quinonediazide compounds to be employed for the invention, for example, the compounds described in pages of 339 to 352 of "Light Sensitive Systems" written by J. Couther, (John Wiley & Sons. Inc.) are usable and particularly, sulfonic acid esters and sulfonic acid amides of o-quinonediazides obtained by reaction with a variety of aromatic polyhydroxy compounds or aromatic aminocompounds are preferable. Further, esters of benzoquinone-(1, 2)-diazidosulfonic acid chloride or naphthoquinone-(1,2)-diazido-5-sulfonic acid chloride with pyrogallol-acetone resin described in Japanese Patent Application Publication (JP-B) No. 43-28403 and esters of benzoquinone-(1,2)-diazidosulfonic acid chloride or naphthoquinone-(1,2)-diazido-5-sulfonic acid chloride with phenol-formaldehyde resin described in U.S. Pat. Nos. 3,046,120, 3,188,210, and the like are also preferable to be employed.

Further, esters of naphthoquinone-(1,2)-diazido-4-sulfonic acid chloride with phenol-formaldehyde resin or cresol-formaldehyde resin and esters of naphthoquinone-(1, 2)-diazido-4-sulfonic acid chloride with pyrogallol-acetone resin are similarly preferable to be employed. Other usable o-quinone diazide compounds are reported in a large number of patent-related documents and have been known. For example, those described in JP-A Nos. 47-5303, 48-63802, 48-63803, 48-96575, 49-38701, 48-13354, JP-B Nos. 41-11222, 45-9610, 49-17481, U.S. Pat. Nos. 2,797,213, 3,454,400, 3,544,323, 3,573,917, 3,674,495, 3,785,825, U.K. Patent Nos. 1,227,602, 1,251,345, 1,267,005, 1,329, 888, 1,330,932, Germany Patent No. 854,890 and the like can be exemplified.

In the invention, the content of the o-quinonediazide compounds is about 1 to 50% by weight, preferably 5 to 30% by weight, and more preferably 10 to 30% by weight. These compounds can be used alone and in form of a mixture of several types of them. If the content of o-quinonediazide compounds is less than 1% by weight, the recording property of an image is deteriorated, whereas if it exceeds 50% by weight, the durability of image areas and the sensitivity are deteriorated.

Hereinafter, the novolak resin to be employed for the embodiment of the above-mentioned (a) and a water-insoluble and alkali-soluble compound to be employed for (b) the laser sensitive positive composition which contains a water-insoluble and an alkali-soluble polymer compound and a photothermal conversion agent and whose solubility in an aqueous alkaline solution is increased by light or heat will be described.

In the invention, the polymer compound insoluble in water and soluble in an aqueous alkaline solution, which is a main component forming an image forming layer, includes polymer compounds having the following acid group structure in the main chain and the side chains of the polymer compounds:

phenolic hydroxy group (—Ar—OH), carboxylic acid group (—$CO_3H$), sulfonic acid group (—$SO_3H$), phosphoric acid group (—$OPO_3H$), sulfonamide (—$SO_2NH$—R), and substituted sulfonamide type acid group (activated imido group) (—$SO_2NHCOR$, —$SO_2NHSO_2R$, and —$CONHSO_2R$).

In this case, Ar represents a bivalent (un)substituted aryl; and R represents an (un)substituted hydrocarbon group.

Among them, as preferable acid groups, (a-1) phenolic hydroxy group, (a-2) sulfonamido group and (a-3) activated imido group can be exemplified and particularly resin soluble in an aqueous alkaline solution and comprising (a-1) phenolic hydroxy group (hereinafter, referred to as resin having a phenolic hydroxy group) is most preferable to be employed.

As (a-1) the polymer compound having a phenolic hydroxy group, for example, novolak type resin such as condensation polymers of phenol and formaldehyde (hereinafter, referred to as phenol-formaldehyde resin), condensation polymers of m-cresol and formaldehyde (hereinafter, referred to as m-cresol-formaldehyde resin), condensation polymers of p-cresol and formaldehyde, condensation polymers of m-/p-mixed cresol and formaldehyde, and condensation polymers of phenol and cresol (m-, p-, and m-/p-mixed type) and formaldehyde and condensation polymers of pyrogallol and acetone can be exemplified. Additionally, copolymers obtained by copolymerization with monomers having phenol group in the side chains are also usable. As the monomers having phenol group, phenol group-containing acrylamide, methacrylamide, acrylic acid ester, methacrylic acid ester, hydroxystyrene and the like can be exemplified. Specifically, preferably usable examples include N-(2-hydroxyphenyl)acrylamide, N-(3-hydroxyphenyl)acrylamide, N-(4-hydroxyphenyl)acrylamide, N-(2-hydroxyphenyl)methacrylamide, N-(3-hydroxyphenyl)methacrylamide, N-(4-hydroxyphenyl)methacrylamide, o-hydroxyphenyl acrylate, m-hydroxyphenyl acrylate, p-hydroxyphenyl acrylate, o-hydroxyphenyl methacrylate, m-hydroxyphenyl methacrylate, p-hydroxyphenyl methacrylate, o-hydroxystyrene, m-hydroxystyrene, p-hydroxystyrene, 2-(2-hydroxyphenyl)ethyl acrylate, 2-(3-hydroxyphenyl) ethyl acrylate, 2-(4-hydroxyphenyl)ethyl acrylate, 2-(2-hydroxyphenyl)ethyl methacrylate, 2-(3-hydroxyphenyl) ethyl methacrylate, 2-(4-hydroxyphenyl)ethyl methacrylate, 2-[N'-(4-hydroxyphenyl)ureido]ethyl acrylate, 2-[N'-(4-hydroxyphenyl)ureido]ethyl acrylate, and the like.

Polymers with a weight average molecular weight of $5.0\times10^2$ to $2.0\times10^5$ and a number average molecular weight of $2.0\times10^2$ to $1.0\times10^5$ are preferable in terms of the image forming capability. Further, these resins may be used alone and also in combination of two or more of the resins. In the case of combinations, condensation polymers of phenol having an alkyl group of 3 to 8 carbons as a substituent and formaldehyde such as condensation polymers of tert-butylphenol and formaldehyde and condensation polymers of octylphenol and formaldehyde described in U.S. Pat. No. 4,123,279 may be used in combination.

Further, as described in U.S. Pat. No. 4,123,279, condensation products of phenol having an alkyl group of 3 to 8 carbons as substituent and formaldehyde such as tert-butylphenol-formaldehyde resin, octylphenol-formaldehyde resin may be used in combination. Such a resin having a phenolic hydroxy group may be used alone or in combination of another or other resins.

In the case of (a-2) the polymer compound having a sulfonamide group and soluble in an aqueous alkaline solution, as (a-2) a monomer having sulfonamide group, which is a main monomer composing the polymer compound, monomers of low molecular weight compounds having at least respectively one sulfonamido group in which at least one hydrogen atom in the nitrogen atom and polymerizable unsaturated bond in one molecule can be exemplified. Among them, low molecular compounds having acryloyl, allyl, vinyloxy, substituted or mono-substituted aminosulfonyl, or substituted sulfonylimino are preferable. Specifically, m-aminosulfonylphenyl methacrylate, N-(p-aminosulfonylphenyl) methacrylate, N-(p-aminosulfonylphenyl)methacrylamide, N-(p-aminosulfonylphenyl)acrylamide and the like can be preferably used.

In the case of (a-3) the polymer compound having an activated imido group and soluble in an aqueous alkaline solution, as such compounds, which are monomers of mainly composing the polymer compound and containing activated imido group in a molecule, specifically N-(p-toluenesulfonyl)methacrylamide, N-(p-toluenesulfonyl) acrylamide and the like are preferable examples to be employed.

In the invention, the content of these novolak resin-containing and alkali-soluble compounds is about 10 to 90% by weight, preferably 20 to 85% by weight, and further preferably 30 to 80% by weight in the entire solid matter in the image forming layer. If the content of the alkali-soluble compound is less than 10% by weight, the durability of the image forming layer is deteriorated, and if it exceeds 90% by weight, both of the sensitivity and the durability are not preferable.

Further, these alkali-soluble compounds maybe used alone or in combination of two or more kinds of them.

The photothermal conversion substance to be employed for (b) the image forming layer will be described below.

In the case of using a planographic printing plate precursor for image recording by IR laser or the like, it is preferable to add a photothermal conversion substance for converting the light energy to the heat energy. The photothermal conversion substance is not necessarily added to the image forming layer, but may be contained in any portion of the planographic printing plate so as to obtain a similar effect. The portion to which the photothermal conversion substance is added may be the hydrophilic surface, the image forming layer, or another layer formed between the hydrophilic surface of the support and the image forming layer.

As usable photothermal conversion substances, any of substances which are capable of absorbing light rays of such as UV rays, visible light, IR rays, incandescent light rays and the like into heat can be used and for example, carbon black, carbon graphite, a pigment, a phthalocyanine-based pigment, an iron powder, a graphite powder, an iron oxide powder, lead oxide, silver oxide, chromium oxide, iron sulfide, chromium sulfide and the like can be exemplified. Particularly preferable ones are dyes, pigments or metals effectively absorbing IR rays with wavelength of 760 nm to 1,200 nm.

As the dyes, commercialized dyes and well-know dyes described in journals (e.g. "Dye Handbook", edited by Organic Synthetic Chemical Associate, 1970) can be employed. Specifically, dyes such as azo dyes, metal complex azo dyes, pyrazolone azo dyes, anthraquinone dyes, phthalocyanine dyes, carbonium dyes, quinone imine dyes, methine dyes, cyanine dyes, metal thiolate complexes and the like. Preferable dyes are, for example, cyanine dyes described in JP-A Nos. 58-125246, 59-84356, 59-202829, and 60-78787, methine dyes described in JP-A Nos. 58-173696, 58-181690, and 58-194595, naphthoquinone dyes described in JP-A Nos. 58-112793, 58-224793, 59-48187, 59-73996, 60-52940, and 60-63744, squarylium dyes described in JP-A No. 58-112792, and cyanine dyes described in U.K. Patent No. 434,875.

Further, near IR absorption sensitizers described in U.S. Pat. No. 5,156,938, substituted arylbenzo(thio)pyrylium salts described in U.S. Pat. No. 3,881,924, trimethinethiapyrylium salts described in JP-A No. 57-142645 (U.S. Pat. No. 4,327,169), pyrylium-based compounds described in JP-A Nos. 58-181051, 58-220143, 59-41363, 59-84248, 59-84249, 59-146063, and 59-146061, cyanine dyes described in JP-A No. 59-216146, pentamethinethiopyrylium salts described in U.S. Pat. No. 4,283,475, and pyrylium compounds disclosed in JP-B Nos. 5-13514, 5-19702 are also preferable to be employed. Further, examples of other preferable dyes include near IR absorption dyes described in those having the formulas (I) and (II) described in U.S. Pat. No. 4,756,993. Particularly preferable compounds among them are cyanine coloring materials, squarylium coloring materials, pyrylium salts, and nickel thiolate complexes.

As the pigments to be employed for the invention, commercialized pigments and pigments described in a color index (C.I.) handbook, "Latest Pigment Handbook" edited by Nippon Pigment Technology Associate, 1977, "Latest Pigment Application Technique" published by CMC in 1986, "Printing Ink Technique" published by CMC in 1984 can be employed. The types of the pigments include black pigments, yellow pigments, orange pigments, brown pigments, red pigments, violet pigments, blue pigments, green pigments, fluorescent pigments, metal powder pigments, and other than these, polymer coupling pigments and the like. Specifically, insoluble azo pigments, azolake pigments, condensed azo pigments, chelated azo pigments, phthalocyanine-based pigments, anthraquinone-based pigments, perylene- and perinone-based pigments, thioindigo-based pigments, quinacridone-based pigments, dioxazine-based pigments, isoindolinone-based pigments, quinophthalone-based pigments, dying lake pigments, azine pigments, nitroso pigments, nitro pigments, natural pigments, fluorescent pigments, inorganic pigments, carbon black and the like can be used. Preferable one among these pigments is carbon black.

These dyes and pigments are preferable to be used in amounts of 0.01 to 50% by weight and preferably 0.1 to 10% by weight in the total solid matter in the photothermal conversion substance-containing layer, respectively and further particularly preferably in 0.5 to 10% by weight for the case of dyes and in 3.1 to 10% by weight for the case of pigments. If the addition amount of the pigments or dyes is less than 0.01% by weight, the sensitivity becomes inferior and if it exceeds 50% by weight, the film strength of the photothermal conversion substance-containing layer becomes weak.

Further, thermally decomposable sulfonic acid ester polymers or acid-decomposable carboxylic acid ester polymers to be employed for producing a laser sensitive positive composition containing the above-mentioned (c) the thermally decomposable sulfonic acid ester polymers or acid-decomposable carboxylic acid ester polymers together with an IR absorption agent include sulfonic acid ester polymers and carboxylic acid ester polymers described in JP-A No. 10-282672, EP 652,483, and JP-A No. 6-502260. Specific polymers are secondary sulfonic acid ester polymers such as polystyrene sulfonic acid cyclohexyl ester, polystyrenesulfonic acid isopropyl ester, polystyrenesulfonic acid 1-methoxy-2-propyl ester, and the like and acrylic acid esters protected with an acid-decomposable group such as polymethacrylic acid tert-butyl ester, polymethacrylic acid tetrahydropyranyl ester and the like.

Further, as the IR absorption agent, those having absorption in the IR region among compounds previously exemplified as the photothermal conversion substances can be employed also in this case.

In the above-mentioned (d) chemically amplified and positively reacting sensitive composition which contains an alkali-soluble compound protected with an acid-decomposable group and an acid generating agent, the alkali-soluble compounds protected with the acid-decomposable group mean compounds which become alkali-soluble by decomposition owing to the acid reaction. As the acid-decomposable group, well-known protection groups such as tert-butyl ester, tert-butyl carbamate, an alkoxyethyl ester and the like can be used.

Further, the acid generating agent means a compound generating an acid by heat or light and generally it includes well-known compounds which generate acids by light and which are used for a photoinitiator for photo cation polymerization, a photoinitiator for photo radical polymerization, a photo decoloration agent for coloring materials, a photo discoloration agent, a micro resist and the like and their mixtures and they are properly selected to be employed. For example, onium salts such as diazonium salts, halides, sulfonic acid esters and the like can be exemplified.

In the invention, the addition amount of the acid generating agent is generally 0.001 to 40% by weight, preferably 0.01 to 20% by weight, and more preferably 0.1 to 5% by weight in the entire solid matter of an image forming layer.
Negatively reacting sensitive composition:

In the invention, as the negatively reacting sensitive composition, the following conventionally well-known negatively reacting sensitive compositions [(e) to (h)] can be employed.

(e) A positively reacting sensitive composition which contains a polymer containing a photo cross-linking group and an azido compound;

(f) A negatively reacting sensitive composition which contains a diazo compound;

(g) A photo or thermally polymerizable and negatively reacting sensitive composition which contains a photo or thermal polymerization initiator, an addition polymerizable unsaturated compound and an alkali-soluble polymer compound; and (h) A negatively reacting sensitive composition which contains an alkali-soluble polymer compound, an acid generating agent, and an acid cross-linking compound.

The compounds to be employed for the negatively reacting sensitive compositions described in the foregoing (e) to (h) will be described below.

The polymer having a cross-linking group to be employed for the above-mentioned (e) a positively reacting sensitive composition which contains a polymer containing a photo cross-linking group and an azido compound is preferable to be a polymer containing the photo cross-linking group having affinity to an aqueous alkaline development solution and for example, polymers having the photo cross-linking group such as —CH=CH—CO— in the main chain or the side chains of the molecules and described in U.S. Pat. No. 5,064,747; copolymers containing cinnamic acid groups and carboxyl groups and described in JP-B No. 54-15711; polyester resins containing phenylene diacrylic acid residue groups and carboxyl groups and described in JP-A No. 60-165646; polyester resins containing phenylene diacrylic acid residue groups and phenolic hydroxyl groups and described in JP-A No. 60-203630; polyester resins containing phenylene diacrylic acid residue groups and sodium iminodisulfonyl groups and described in JP-A No. 57-42858; polymers containing azido groups and carboxyl groups in the side chains and described in JP-A No. 59-208552 and the like can be employed. In the invention, the content of the polymer having the photo cross-linking groups is about 5 to 100% by weight, preferably 10 to 95% by weight, and more preferably 20 to 90% by weight in the entire solid matter in the image forming layer.

Further, as the azido compound to be employed for the embodiment of (e), 2,6-bis(4-azidobenzal)-4-methylcyclohexanone, 4,4'-diazidodiphenylsulfide and the like can be exemplified.

In the invention, the content of the azido compound is about 5 to 95% by weight, preferably 10 to 90% by weight, and further preferably 20 to 80% by weight in the entire solid matter of the image forming layer.

As a diazo compound to be employed for the above-mentioned (f) negatively reacting sensitive composition containing a diazo compound, for example, diazo resins such as salts of condensation products of diazodiarylamines and activated carbonyl compounds can be exemplified and those photosensitive and water-insoluble and soluble in organic solvents are preferable.

Especially preferable diazo resins include, for example, organic acid salts or inorganic acid salts of condensation products of 4-diazodiphenylamine, 4-diazo-3-methyldiphenylamine, 4-diazo-4'-methyldiphenylamine, 4-diazo-3'-methyldiphenylamine, 4-diazo-4'-methoxydiphenylamine, 4-diazo-3-methyl-4'-ethoxydiphenylamine, and 4-diazo-3-methoxydiphenylamine with formaldehyde, paraformaldehyde, acetaldehyde, benzaldehyde, 4,4'-bis-methoxymethyldiphenyl ether and the like. As the organic acid in this case, for example, methanesulfonic acid, benzenesulfonic acid, toluenesulfonic acid, xylenesulfonic acid, mesitylenesulfonic acid, dodecylbenzenesulfonic acid, naphthalenesulfonic acid, propylnaphthalenesulfonic acid, 1-naphthol-5-sulfonic acid, 2-nitrobenzenesulfonic acid, 3-chlorobenzenesulfonic acid, 2-hydroxy-4-methoxybenzophenone-5-sulfonic acid, and the like can be exemplified and as the inorganic acid, hexafluorophosphoric acid, tetrafluoroboric acid, thiocyanic acid and the like can be exemplified.

Further, diazo resins having polyester groups in the main chains and described in JP-A No. 54-30121; diazo resins produced by reaction of polymers containing carboxylic acid anhydride residue groups and diazo compounds having hydroxyl groups and described in JP-A No. 61-273538; and diazo resins produced by reaction of polyisocyanate compounds and diazo compounds having hydroxyl groups are also usable.

In the invention, the content of the diazo resins is preferable to be 0 to 40% by weight in the entire solid matter of the image forming layer. Further, if necessary, two or more kinds of the diazo resins may be employed in combination.

As a photo or thermal polymerization initiator and an addition polymerizable unsaturated compound to be employed for the above-mentioned (g) photo or thermally polymerizable and negatively reacting sensitive composition containing a photo or thermal polymerization initiator, an addition polymerizable unsaturated compound and an alkali-soluble polymer compound, compounds having addition polymerizable ethylenic double bonds can be exemplified and they may be properly selected from compounds having at least one or preferably two or more of terminal ethylenic unsaturated bonds in a molecule.

Such compounds include, for example, monomers, prepolymers (oligomers including dimers, trimer and the like) and their mixtures and also those having chemical forms like low molecular weight copolymers containing structure units having such unsaturated bonds.

Examples of the monomers and their copolymers are esters of unsaturated carboxylic acids (e.g. acrylic acid, methacrylic acid, itaconic acid, crotonic acid, isocrotonic acid, maleic acid and the like) and aliphatic polyhydric alcohol compounds, amides of unsaturated carboxylic acids and aliphatic polyvalent amine compounds and the like.

Specific examples of the monomers of esters of the aliphatic polyhydric alcohol compounds and unsaturated carboxylic acids include, as acrylic acid esters, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol pentaacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer and the like.

As the methacrylic acid esters, specific examples include tetraethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, dipentaerythritol dimethacrylate, dipentaerythritol hexamethacrylate, dipentaerythritol pentamethacrylate, sorbitol trimethacrylate, sorbitol tetramethacrylate, bis[p-(3-methacryloxy-2-hydroxypropoxy)phenyl]dimethylmethane, bis-[p-(methacryloxyethoxy)phenyl]dimethylmethane and the like.

As itaconic acid esters, examples include ethylene glycol diitaconate, propylene glycol diitaconate, 1,3-butanediol diitaconate, 1,4-butanediol diitaconate, tetramethylene glycol diitaconate, pentaerythritol diitaconate, sorbitol tetraitaconate, and the like.

As crotonic acid esters, examples include ethylene glycol dicrotonate, tetramethylene glycol dicrotonate, pentaerythritol dicrotonate, sorbitol tetracrotonate, and the like.

As isocrotonic acid esters, examples include ethylene glycol diisicrotonate, pentaerythritol diisocrotonate, sorbitol tetraisocrotonate, and the like.

As maleic acid esters, examples include ethylene glycol dimaleate, triethylene glycol dimaleate, pentaerythritol dimaleate, sorbitol tetramaleate, and the like.

Further, mixtures of the above-mentioned ester monomers can be also exemplified.

Specific examples of the monomers of amides of aliphatic polyvalent amine compounds and unsaturated carboxylic acids include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, xylylene bismethacrylamide and the like.

Other examples include vinylurethane compounds and the like containing two or more polymerizable vinyl groups in one molecule and produced by adding a vinyl monomer containing hydroxyl and having the following general formula (A) to a polyisocyanate compound having two or more isocyanate groups in one molecule and described in JP-B No. 48-41708.

$$CO_2=C(R^3)COOCH_2CH(R^4)OH \qquad (A)$$

(wherein, $R^3$ and $R^4$ independently represent H or $CH_3$)

Further, urethane acrylates as described in JP-A No. 51-37193 and JP-B No. 2-32293; polyesteracrylates as described in JP-A No. 48-64183 and JP-B Nos. 49-43191 and 52-30490; and polyfunctional acrylates and methacrylates such as epoxy acrylates and the like obtained by reaction of epoxy resin and (meth)acrylic acid can be exemplified. Further, those shown as photocurable monomers and oligomers in Nippon Adhesive Associate Journal vol. 20, No. 7, pp. 300–308, 1984 are also usable.

The content of the addition polymerizable unsaturated compounds is about 5 to 95% by weight and preferably 5 to 80% by weight in the entire solid matter in the image forming layer.

As the photo (thermal) polymerization initiator contained in the image forming layer of the invention, a variety of photo (thermal) initiators well-known in patent journals and journal documents or combination systems (initiation system) of two or more initiators may be properly selected to be used.

Even in the case that visible light with 400 nm or longer wavelength, Ar laser, secondary harmonics of semiconductor laser, or SHG-YAG laser is used as a light source, a variety of photo initiator systems have been proposed and examples includes systems of a variety of photoreductive dyes described in U.S. Pat. No. 2,850,445, e.g. Rose Bengale, Erythrocin and the like or systems of combinations dyes and initiators, e.g. composite initiator systems of dyes and amines (JP-B No. 44-20189); combination systems of hexaaryl bisimidazole, radical generating agents, and dyes (JP-B No. 45-37377); systems of hexaaryl bisimidazole and p-dialkylaminobenzylidene ketones (JP-B No. 47-2528, JP-A No. 54-155292); systems of cyclic sis-α-dicarbonyl compounds and dyes (JP-A No. 48-84183); system of cyclic triazine merocyanine dyes (JP-A No. 54-151024); 3-ketocumarin and activating agents (JP-A Nos. 52-112681 and 58-15503); systems of bisimidazole, styrene derivatives, and tiols (JP-A No. 59-140203); systems of organic peroxides and coloring materials (JP-A Nos. 59-1504, 59-140203, 59-189340, and 62-174203, JP-B No. 62-1641, U.S. Pat. No. 4,766,055); systems of dyes and activated halides (JP-A Nos. 63-258903 and 2-63054); systems of dyes and borate compounds (JP-A Nos. 62-143044, 62-150242, 64-13140, 64-13141, 64-13142, 64-13143, 64-13144, 64-17048, 1-229003, 1-298348, 1-138204 and the like); systems of coloring materials having rhodanine ring and radical generating agents (JP-A Nos. 2-179643 and 2-244050); systems of titanocenes and 3-ketocumarin coloring materials (JP-A No. 63-221110); systems of combinations of titanocenes, xanthene coloring materials, and ethylenic unsaturated compounds containing amino groups or urethane groups (JP-A Nos. 4-221958 and 4-219756); systems of titanocenes and specified merocyanine coloring materials (JP-A No. 6-295061), and systems of titanocene and benzopyran ring-containing coloring materials (JP-A No. 8-334897).

In the case IR laser is used especially as an exposure light source, combinations of photothermal conversion agents and radical generating agents as initiators are employed. The compounds preferable for the radical generating agent in that case are onium compounds and specific examples are iodonium salts, diazonium salts, and sulfonium salts.

The use amount of these polymerization initiator is in a range 0.05 to 100 parts by weight, preferably 0.1 to 70 parts by weight, further preferably 0.2 to 50 parts by weight to 100 parts by weight of the ethylenic unsaturated compounds.

The content of the photopolymerization initiators is about 1 to 80% by weight and preferably 5 to 50% by weight in the entire solid matter in the image forming layer.

The acid photo cross-linking compounds to be employed for the above-mentioned (h) negatively reacting sensitive composition containing an alkali-soluble polymer compound, an acid generating agent, and an acid cross-linking compound mean compounds cross-linked in the presence of an acid and for example, aromatic compounds and heterocyclic compounds poly-substituted with hydroxymethyl groups, acetoxymethyl groups, and alkoxymethyl groups can be exemplified and preferable compounds among them are those obtained by condensation of phenols and aldehydes under basic conditions.

Those preferable among the above-mentioned compounds include, for example, a compound obtained as described above by condensation of phenol and formaldehyde under basic conditions, similarly a compound obtained from m-cresol and formaldehyde, a compound obtained from bisphenol A and formaldehyde, a compound from 4,4'-bisphenol and formaldehyde, and other than them, compounds disclosed as resol resins in GB No. 2,082,339 can be exemplified.

These acid photo cross-linking compound are preferable to have a weight average molecular weight of 500 to 100,000 and a number average molecular weight 200 to 50,000.

Other preferable examples are aromatic compounds substituted with alkoxymethyl or oxysilanylmethyl group and described in EP-A No. 0,212,482; monomer- or oligomer-melamine-formaldehyde condensation products and urea-formaldehyde condensation products described in EP-A No. 0,133,216, DE-A No. 3,634,671, and DE No. 3,711,264; and alkoxy-substituted compounds disclosed in EP-A No. 0,212,482 and the like.

Further, other preferable examples are, for example, melamine-formaldehyde derivatives having at least two free N-hydroxymethyl, N-alkoxymethyl or N-acyloxymethyl groups. Among these compounds, N-alkoxymethyl derivatives are particularly preferable.

Further, low molecular weight or oligomer silanols can be employed as silicon-containing photo cross-linking agents. Their examples are dimethyl- and diphenyl-silanediols and oligomers previously preliminarily condensed and containing these monomer units and for example, compounds disclosed in EP-A No. 0,377,155 can be employed.

The photothermal conversion agents to be employed in an embodiment of the above-mentioned (h) are similar to the photothermal conversion substances exemplified in the above-mentioned positively reacting sensitive composition and also the acid generating agents are similar to those employed for the above-mentioned positively reacting sensitive composition.

The alkali-soluble polymer compounds to be employed in an embodiment of the above-mentioned (h) are similar to the alkali-soluble polymer compounds exemplified in the above-mentioned positively reacting sensitive composition and other than them, the following polymer compounds can be used.

Addition polymers having carboxylic acid groups in side chains and for example, those described in JP-A No. 59-44615, JP-B Nos. 54-34327, 58-12577, and 54-25957, JP-A Nos. 54-92723, 59-53836, and 59-71048, that is, methacrylic acid copolymers, acrylic acid copolymers, itaconic acid copolymers, crotonic acid copolymers, maleic acid copolymers, partially esterified maleic acid copolymers and the like can be exemplified.

Similarly, acidic cellulose derivatives having carboxylic acid groups in side chains can be exemplified. Besides, those obtained by addition of cyclic acid anhydride to the addition polymers having hydroxyl groups are useful. Particularly, among them, [benzyl(meth)acrylate/(meth)acrylic acid/ other addition polymerizable vinyl monomer if necessary] copolymers and [allyl(meth)acrylate/(meth)acrylic acid/other addition polymerizable vinyl monomer if necessary] copolymers are suitable to be used.

Other than them, as the water-soluble organic polymers, polyvinylpyrrolidone and polyethylene oxide and the like are useful. Further, in order to increase the strength of a cured coating, alcohol-soluble polyamides and polyethers of 2,2-bis-(4-hydroxyphenyl)-propane and epichlorohydrine are also useful.

Further, polyurethane resins described in JP-B Nos. 7-120040, 7-120041, 7-120042, and 8-12424, JP-A Nos. 63-287944, 63-287947, 1-271741, and 11-352691 are useful for the purposes of the invention.

Introduction of radical reactive groups into side chains of these high molecular weight polymers makes it possible to improve the strength of a cured coating. Addition polymerizable functional groups include ethylenic unsaturated bond-containing groups, amino groups, epoxy groups and the like and functional groups to be radicals by light radiation include mercapto groups, thiol groups, halogen atoms, triazine structures, onium salt structures and the like and polar groups include carboxyl groups, imido groups and the like. As the above-mentioned addition polymerizable functional groups, ethylenic unsaturated bond-containing groups such as acryl, methacryl, allyl, styryl and the like are particularly preferable and functional groups selected from amino group, hydroxyl, phosphonic acid group, phosphoric acid group, carbamoyl group. isocyanate group, ureido group, ureine group, sulfonic acid group, and ammonio group are also useful.

In order to retain the development properties of the image forming layer, it is preferable for the high molecular weight polymer to be employed for the layer formation to have a proper molecular weight and an acid value. Generally, high molecular weight polymers having a weight average molecular weight of 5,000 to 300,000 and an acid value of 0.2 to 5.0 meq/g are preferable to be used.

These organic high molecular weight polymers may be added in an optional amount in the entire composition. However, in the case of exceeding 90% by weight, preferable results in terms of the formed image strength and the like cannot be achieved. Accordingly, the amount is preferably 10 to 90% and further preferably 30 to 80%. The ratio of the photopolymerizable ethylenic unsaturated compounds and the organic high molecular weight polymers is preferably controlled to be in a range of 1/9 to 9/1 by weight. Further preferable range is 2/8 to 8/2 and furthermore preferable range is 3/7 to 7/3.

Other Components

To the image forming layer according to the invention, in order to obtain a variety of characteristics of a planographic printing plate, a variety of compounds maybe added based on necessity besides the above-mentioned compounds.

For the image forming layer of a planographic printing plate precursor using the support of the invention, dyes having high absorption in the visible light region may be used as the coloring agents.

Specifically, dyes such as Oil Yellow #101, Oil Yellow #103, Oil Pink #312, Oil Green BG, Oil Blue BOS, Oil Blue #603, Oil Black BY, Oil Black BS, Oil Black T-505 (the above are produced by Orient Chemical Industries, Ltd.), Victoria Pure Blue, Crystal Violet (CI42555), Methyl Violet (CI42535), Ethyl Violet, Rhodamine B (CI145170B), Malachite Green (CI42000), Methylene Blue (CI52015) and the like or dyes described in JP-A No. 62-293247 can be exemplified.

These dyes are preferable to be added since they make it easy to distinguish image areas and non-image areas after image formation. Incidentally, the addition amount is 0.01 to 10% by weight to the entire solid matter in the image forming layer.

Further, to the image forming layer of the invention, in order to expand the treatment stability under development conditions, nonionic surfactants described in JP-A Nos. 62-251740 and 3-208514 and amphoteric surfactants described in JP-A Nos. 59-121044 and 4-13149 may be added.

Specific examples of the nonionic surfactants include sorbitan tristearate, sorbitan monopalmitate, sorbitan trioleate, stearic acid monoglyceride, polyoxyethylenenonyl phenyl ether and the like.

Specific examples of the amphoteric surfactants include alkyldi(aminoethyl)glycine, alkylpolyaminoethylglycine hydrochloric acid salt, 2-alkyl-N-carboxyethyl-N-hydroxyethylimidozolinium betain, N-tetradecyl-N,N-betain-type (e.g. trade name; Amogen K produced by Dai-ichi Seiyaku Co., Ltd.) surfactant and the like. The ratio of the above-mentioned nonionic surfactant and amphoteric surfactant in the image forming layer of the planographic printing plate precursor is preferably 0.05 to 15% by weight and more preferably 0.1 to 5% by weight.

Further, if necessary, a plasticizer is added to the image forming layer of the invention in order to provide softness of the coating. For example, oligomers and polymers of butylphthalyl, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, acrylic acid, or methacrylic acid are employed.

Besides, the above-mentioned onium salts, haloalkyl-substituted s-triazine, epoxy compounds and vinyl ethers and further hydroxymethyl-containing phenol compounds and alkoxymethyl-containing phenol compounds described in JP-A No. 7-18120 may be added.

In the invention, the image forming layer is formed generally by dissolving the above-mentioned respective components in a solvent and applying the resulting solution to the above-mentioned hydrophilic layer or hydrophilic surface of a support.

The solvent to be employed in this case includes ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, water and the like, however it is not restricted to these compounds. These solvents may be used alone or in form of a mixture.

The concentration of the above-mentioned components (the entire solid matter including additives) in the solvent is preferably 1 to 50% by weight. Although it differs depending on the use, the application amount (solid matter) of the coating on the hydrophilic layer obtained after drying is generally preferable to be 0.5 to 5.0 g/m° in the case of the planographic printing plate precursor. As the coating amount is decreased more, the apparent sensitivity is increased more, however the coating properties of the image recording film are deteriorated.

A variety of methods may be employed for the application method and for example, bar coater coating, rotation coating, spray coating, curtain coating, dip coating, air knife coating, blade coating, roll coating and the like can be exemplified.

To the image forming layer of the planographic printing plate precursor of the invention, a surfactant for improving the coating property, for example, a fluoro type surfactant described in JP-A No. 62-170950 may be added. The addition amount is preferably 0.01 to 1% by weight and further preferably 0.05 to 0.5% by weight in the entire solid matter of the image forming layer.

Support Substrate:

Since the support of the invention is used for the planographic printing plate precursor, it is required to use a plate-like substance stable in size for the substrate and due to formation of hydrophilic surface, those satisfying needed characteristics such as strength, durability, flexibility and the like are preferable to be selected. For example, paper laminated with plastics (e.g. polyethylene, polypropylene, polystyrene and the like), metal plates (e.g. aluminum, zinc, copper and the like), plastic films (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal and the like) paper and plastic film laminated with the above-mentioned metals or coated with these metals by vacuum evaporation are included.

The support of the invention is preferably a polyester film or an aluminum plate and between them, the aluminum plate, which has excellent size stability and is relatively economical, is particularly preferable.

The preferable aluminum plate is a pure aluminum plate or an alloy plate containing aluminum as a main component and a trace of impurity elements and further a plastic film laminated with aluminum or coated with aluminum by vacuum evaporation may be used. The impurity elements contained in the aluminum alloy are silicon, iron, manganese, copper, magnesium, chromium, zinc, bismuth, nickel, titanium and the like. The content of the impurity elements in the alloy is at highest 10% by weight. Particularly preferable aluminum in the invention is pure aluminum, however since completely pure aluminum is difficult to be manufactured in relation to the refining technique, aluminum containing a trace of impurity elements may be used.

Such an aluminum plate to be employed for the invention is not restricted in the composition and aluminum plates of conventionally well-known and widely used materials may be properly used. The thickness of the aluminum plate to be employed for the invention is about 0.1 mm to 0.6 mm, preferably 0.15 mm to 0.4 mm, and particularly preferably 0.2 mm to 0.3 mm.

The aluminum plate to be used for the substrate may be subjected to surface treatment such as surface-roughening treatment, anodization treatment. Such surface treatment will be briefly described below.

Prior to the surface-roughening of the aluminum plate, depending on the necessity, degreasing treatment with, for example, a surfactant, an organic solvent, an aqueous alkaline solution and the like is carried out to remove the rolling oil on the surface. The surface-roughening treatment of the surface of the aluminum plate may be carried out by a variety of methods, for example, a mechanically surface-roughening method, an electrochemically surface-dissolving and roughening method, and a chemically selectively surface-dissolving method. As the mechanical method, well-known methods such as a ball polishing method, a brush polishing method, a blast polishing method, a buff polishing method and the like can be employed. As the electrochemical surface-roughening method, methods carried out by applying a.c. current or d.c. current in a hydrochloric acid or nitric acid electrolytic solution can be employed. Further, methods comprising both methods in combination as disclosed in JP-A No. 54-63902 can be also employed.

After being subjected to alkali etching treatment and neutralization treatment based on necessity, the aluminum plate surface-roughened in such a manner is anodized if desirable, in order to improve the water retention property and the wear resistance of the surface. As the electrolytic substance to be employed for the anodization treatment of the aluminum plate, a variety of electrolytic substances to form a porous oxide coating are usable and generally, sulfuric acid, phosphoric acid, oxalic acid, chromic acid and their mixed acids are employed. The concentration of these electrolytic substances can be properly determined depending on the types of the electrolytic substances.

Since the treatment conditions of the anodization differ variously depending on the electrolytic substances, they cannot be specifically generalized, however generally, it is adequate that the concentration of the electrolytic substances is 1 to 80% by weight, the solution temperature is 5 to 70° C., the current density is 5 to 60 A/dm$^2$, the voltage is 1 to 100 V, the electrolysis duration is in a range from 10 seconds to 5 minutes. If the amount of the anodized coating is less than 1.0 g/m$^2$, the durability to printing becomes insufficient and scratches are easily formed in the non-image areas of the planographic printing plate precursor and so-called scratching stains owing to ink adhesion to the scratched portions at the time of printing are easily caused.

In the case the plastic film such as a polyester film and the like, which is another preferable embodiment, is used, in terms of formability of the hydrophilic surface and the adhesion strength to a recording layer to be formed thereon, those having roughened surface in which the hydrophilic surface is to be formed are preferable to be employed. Hereinafter, examples of the preferable surface state of the support surface (solid surface) to be employed for the invention will be described.

The preferable surface-roughened state of the support member to be employed for the invention includes the two-dimensional parameters; the center line average roughness (Ra) in a range of 0.1 to 1 $\mu$m, the maximum height (Ry) in a range of 1 to 10 $\mu$m, the ten-point average roughness (Rz) in a range of 1 to 10 $\mu$m, the average interval (Sm) of projections and recessions in a range of 5 to 80 $\mu$m, the average interval (S) of local summits in a range of 5 to 80 $\mu$m, the maximum height (Rt) in a range of 1 to 10 $\mu$m, the center line peak height (Rp) in a range of 1 to 10 $\mu$m, and the center line valley depth (Rv) in a range of 1 to 10 $\mu$m and those satisfying at least one of these conditions are preferable and those satisfying them all are further preferable.

The above-mentioned two dimensional roughness parameters are based on the following definitions.

[the center line average roughness (Ra)]: The value calculated by extracting portions of a measurement length L from roughness curved lines in the center line direction and mathematically averaging the absolute values of the deviations between the center lines of the extracted portions and the roughness curved lines;

[the maximum height (Ry)]: the value obtained by extracting portions of a standardized length from roughness curved lines in the average line direction and measuring the intervals between the summit lines and the valley bottom lines of the extracted portions in the vertical magnification direction of the roughness curved lines;

[the ten-point average roughness (Rz)] the value expressed by micrometer ($\mu$m) and obtained by extracting portions of a standardized length from roughness curved lines in the average value direction and adding the average value of the absolute height values (YP) of the highest summit to the 5th summit peak and the average value of the absolute depth values of the lowest valley bottom to the 5th valley bottom depth in the vertical magnification direction of the roughness curved lines;

[the average interval (Sm) of projections and recessions]: the value expressed by micrometer ($\mu$m) and obtained by extracting portions of a standardized length from roughness curved lines in the average line direction and calculating the addition values of the average lines corresponding to one peak and neighboring one valley in the respective extracted portions and mathematically calculating the average values of the intervals between projections and recessions in a large number;

[the average interval (S) of local summits]: the value expressed by micrometer ($\mu$m) and obtained by extracting portions of a standardized length from roughness curved lines in the average line direction and calculating the length of the average lines corresponding to neighboring local summits in the respective extracted portions and mathematically calculating the average values of the intervals between the neighboring local summits in a large number;

[the maximum height (Rt)]: the value of the intervals of two straight lines obtained by extracting portions of a standardized length from roughness curved lines and sandwiching the extracted portions between two lines parallel to the center lines of the portions;

[the center line peak height (Rp)]: the value calculated by extracting portions of a measurement length L from roughness curved lines in the center line direction and measuring the intervals from the straight lines passing the highest summits parallel to the center lines of the extracted portions; and [the center line valley depth (Rv)]: the value calculated by extracting portions of a measurement length L from roughness curved lines in the center line direction and measuring the intervals from the straight lines passing the deepest valley bottoms parallel to the center lines of the extracted portions.

The planographic printing plate precursor obtained in such a manner becomes a planographic printing plate by imagewise exposure and development by normal methods.

Since the support for the planographic printing plate of the invention has excellent hydrophilic surface and is capable of retaining high hydrophilicity for a long duration, in the case a planographic printing plate precursor is obtained by forming a desired image forming layer, a large number of excellent printings with no stain in the non-image areas can be obtained independently of the constitution of the image forming layer.

EXAMPLES

Hereinafter, the present invention will be described in details with reference to examples, however the scope of the invention is not at all restricted to these examples.

Example 1

Synthesis Example 1

Synthesis of Hydrophilic Graft Polymer (1)

After 30 g of acrylamide and 3.8 g of 3-mercaptopropionic acid were dissolved in 70 g of ethanol, the obtained solution was heated to 60° C. under nitrogen atmosphere and mixed with 300 mg of thermal polymerization initiator, 2,2-azobisisobutyronitrile (AIBN) and reacted for 6 hours. After the reaction, white precipitates were filtered and sufficiently washed with methanol to obtain 30.8 g of carboxylic acid-terminated prepolymer (the acid value of 0.787 meq/g; the weight average molecular weight of $1.29 \times 10^3$).

The obtained prepolymer 20 g was dissolved in 62 g of dimethyl sulfoxide and mixed with 6.71 g of glycidyl methacrylate, 504 mg of N,N-dimethyldodecylamine (a catalyst), and 62.4 mg of hydroquinone (a polymerization inhibiting agent) to precipitate a polymer which was well washed to obtain 23.4 g of methacrylate-terminated acrylamide macromonomer (the weight average molecular weight; 1,400). It was confirmed that polymerizable groups were introduced in the terminals based on the olefin peaks of methacryloyl in 6.12 and 5.70 ppm by $^1$H-NMR ($D_2O$) and decrease of the acid value (0.057 meq/g).

To a flask containing 15 g of the above obtained macromonomer and 53.4 g of dimethyl sulfoxide, a solution obtained by dissolving 1.05 g of 3-methacryloxypropyltrimethoxysilane and 161 mg of 2,2-azobis(2,4-dimethylvaleronitrile) in 53.4 g of dimethyl sulfoxide was dropwise titrated at 65° C. under nitrogen atmosphere for 2 hours.

On completion of the titration, heating was continued for 6 hours. The reaction solution was poured to acetone to precipitate a polymer which was well-washed to obtain 14.8 g of a hydrophilic graft polymer (1) (the weight average molecular weight of $1.30 \times 10^3$).

It was confirmed that the hydrophilic graft polymer (1) was obtained based on disappearance of the olefin peaks of methacryloyl in 6.12 and 5.70 ppm by $H^1$-NMR ($D_2O$) and appearance of 0.80 ppm of proton peak neighboring methoxysilyl group.

Formation of Hydrophilic Layer:

The following components were evenly mixed and stirred at 20° C. for 2 hours to carry out hydrolysis and obtain a sol-state hydrophilic coating solution composition 1.

Hydrophilic Coating Solution Composition 1:

| | |
|---|---|
| hydrophilic graft polymer (1) (the product of the above-mentioned synthesis example 1) | 0.21 g |
| tetramethoxysilane (cross-linking component) | 0.62 g |
| ethanol | 4.70 g |
| water | 4.70 g |
| aqueous nitric acid solution (1 N) | 0.10 g |

Using a glass plate (manufactured by Endo Chemical) as a support, the above-mentioned hydrophilic coating solution composition 1 was applied so as to adjust the coating amount after drying to be 2 g/m$^2$ and heated and dried at 100° C. for 10 minutes to form a hydrophilic layer of an organic and inorganic composite and accordingly obtain a hydrophilic member 1.

The contact angle of the hydrophilic layer surface of the obtained hydrophilic member 1 to air water droplets was measured by a measurement apparatus (trade name: CA-Z, manufactured by Kyowa Interface Science Co., Ltd.) to find that the contact angle was 8.9° and the hydrophilic member had excellent hydrophilicity.

After the surface of the obtained hydrophilic member was rubbed with an unwoven cloth (trade name: BEMCOT, produced by Asahi Chemical Fiber Co., Ltd.) 100 times, the surface of the member was observed to find that no peeling of the hydrophilic layer in the surface took place even after the rubbing or no scratch observable with eyes was caused.

Further, it was found that the contact angle after the rubbing was 9.2°. Sufficient hydrophilicity was shown even after rubbing and accordingly the hydrophilic member of the invention was found having excellent wear resistance.

Example 2

A hydrophilic member 2 was obtained by forming a hydrophilic layer using the hydrophilic coating solution composition 1 in the same manner as Example 1, except that a biaxially extended polyethylene terephthalate film (trade name: A4100, manufactured by Toyobo Co., Ltd.) with a film thickness of 188 μm and subjected to corona treatment was used as a support in place of the glass plate employed in Example 1.

The contact angle of the hydrophilic layer surface of the obtained hydrophilic member 2 to air water droplets was measured by a measurement apparatus (trade name: CA-Z, manufactured by Kyowa Interface Science Co., Ltd.) to find that the contact angle was 9.0° and the hydrophilic member had excellent hydrophilicity. Further, when evaluation of the wear resistance was carried out in the same manner as Example 1, it was found that no peeling of the hydrophilic layer in the surface took place even after the rubbing or no scratch observable with eyes was caused and accordingly the wear resistance was found excellent even in the case of using a PET support.

Further, the contact angle after the rubbing was found to be 9.5° to confirm that sufficient hydrophilicity was shown even after rubbing.

Example 3

Synthesis Example 2

Synthesis of Hydrophilic Graft Polymer (2)

To a flask containing 7.5 g of the above obtained macromonomer and 18.1 g of dimethyl sulfoxide, a solution obtained by dissolving 0.51 g of methacrylamide, 1.05 g of 3-methacryloxypropyltrimethoxysilane, and 90.6 mg of 2,2-azobis(2,4-dimethylvaleronitrile) in 18.1 g of dimethyl sulfoxide was dropwise titrated at 65° C. under nitrogen atmosphere for 2 hours.

On completion of the titration, heating was continued for 6 hours. The reaction solution was poured to acetone to precipitate a polymer which was well-washed to obtain 8.9 g of a hydrophilic graft polymer (2) (the weight average molecular weight of $1.01 \times 10^5$).

It was confirmed that the hydrophilic graft polymer (2) was obtained based on disappearance of the olefin peaks of methacryloyl in 6.12 and 5.70 ppm by $H^1$-NMR ($D_2O$) and appearance of 0.80 ppm of proton peak neighboring methoxysilyl group.

A hydrophilic member 3 was obtained in the same manner as Example 1, except that the hydrophilic graft polymer (2) obtained in the above-mentioned Synthesis example 2 in place of the hydrophilic graft polymer (1).

The contact angle of the hydrophilic layer surface of the obtained hydrophilic member 3 to air water droplets was measured in the same manner as Example 1 to find that the contact angle was 9.0° and the hydrophilic member had excellent hydrophilicity. Further, when evaluation of the wear resistance was carried out in the same manner as Example 1, the results by observation with eyes after rubbing were excellent and the contact angle after the rubbing was found to be 9.8° to confirm that sufficient hydrophilicity was shown even after rubbing and the wear resistance was excellent.

Example 4

Synthesis Example 3

Synthesis of Hydrophilic Graft Polymer (3)

To a flask containing 7.5 g of the above obtained macromonomer and 18.1 g of dimethyl sulfoxide, a solution obtained by dissolving 0.51 g of N-vinylacetamide, 1.05 g of 3-methacryloxypropyltrimethoxysilane, and 90.6 mg of 2,2-azobis(2,4-dimethylvaleronitrile) in 18.1 g of dimethyl sulfoxide was dropwise titrated at 65° C. under nitrogen atmosphere for 2 hours.

On completion of the titration, heating was continued for 6 hours. The reaction solution was poured to acetone to precipitate a polymer which was well-washed to obtain 8.9 g of a hydrophilic graft polymer (3) (the weight average molecular weight of $1.01 \times 10^5$).

It was confirmed that the hydrophilic graft polymer (3) was obtained based on disappearance of the olefin peaks of methacryloyl in 6.12 and 5.70 ppm by $H^1$-NMR ($D_2O$) and appearance of 0.80 ppm of proton peak neighboring methoxysilyl group.

A hydrophilic member 4 was obtained in the same manner as Example 1, except that the hydrophilic graft polymer (3) obtained in the above-mentioned Synthesis example 3 was used in place of the hydrophilic graft polymer (1).

The contact angle of the hydrophilic layer surface of the obtained hydrophilic member 4 (to air water droplets) was measured in the same manner as Example 1 to find that the contact angle was 10.0° and the hydrophilic member had excellent hydrophilicity. Further, when evaluation of the wear resistance was carried out in the same manner as Example 1, the results by observation with eyes after rubbing were excellent and the contact angle after the rubbing was found to be 10.0° and accordingly it was confirmed that sufficient hydrophilicity was shown even after rubbing and the wear resistance was excellent.

Example 5

Production of Support

After a 0.3 mm-thick aluminum plate (containing at least 99.5% of aluminum and Fe, 0.30%, Si 0.10%, Ti 0.02%, and Cu 0.013%) was degreased by washing with trichloroethylene, the surface was sand-blasted using a nylon brush and an aqueous suspension containing 400 mesh permistone and the plate was washed well with water. The resulting plate was immersed in an aqueous solution of 25% by weight of sodium hydroxide for 9 seconds to etch the plate and then, after washing with water, the plate was further immersed in 2% by weight of nitric acid for 20 seconds and washed with water. At that time, the etching degree of the sand-blasted surface was about 3 g/m².

Next, the obtained plate was anodized by applying 15 A/dm² current density using 7% by weight of sulfuric acid as an electrolytic solution to form a 2.4 g/m²-thick oxide coating by d.c. anodization and then the plate was washed with water and dried to obtain a support.

Formation of Hydrophilic Layer

The above-mentioned hydrophilic coating solution composition 1 was applied to the above-mentioned aluminum support so as to adjust the coating amount to be 2 g/m² after drying and heated and dried at 100° C. for 10 minutes to form a hydrophilic layer of an organic and inorganic composite and obtain a hydrophilic member.

Formation of Image Forming Layer

Using a lot bar #15, the following coating solution for an image forming layer was applied to the above-mentioned hydrophilic layer so as to adjust the coating amount to be 1.0 g/m² after drying and dried at 80° C. for 2 minutes to form a positive image forming layer and obtain a planographic printing plate precursor of Example 1.

Coating Solution 1 for Positive Type Image Forming Layer: Sulfonic Acid Ester-based

| polystyrenesulfonic acid 1-methoxy-2-propyl ester | 0.40 g |
| IR absorptive dye I [with the following structural formula] | 0.05 g |
| methyl ethyl ketone | 4.00 g |

IR Absorptive Dye I

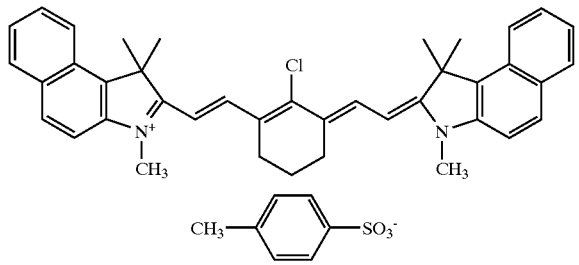

Evaluation of Planographic Printing Plate Precursor

Imagewise exposure was carried out for the obtained positive type planographic printing plate precursor under the conditions of outer face drum rotation speed of 100 rpm, the plate face energy of 300 mJ/m², and resolution degree of 2,400 dpi using an exposing apparatus (trade name: Trend Setter 3244 VFS, manufactured by CREO Co., Ltd.) equipped with water-cooling type 40 W IR semiconductor laser.

Without being subjected to the development treatment, the exposed precursor was installed in a printing apparatus (trade name: SOR-M, manufactured by Hyderburg Co.) and printing was started as it was. Dampening water (trade name: IF201 (2.5%) and IF 202 (0.75%), both produced by Fuji Photo Film Co., Ltd.) and ink (trade name: GEOS-G Ink, produced by Dainippon Ink and Chemicals, Incorporated) were used. In the initial stage of the printing step, the image forming layer remaining in the non-image areas was removed and a high quality printing was obtained. When printing was continuously carried out thereafter, the planographic printing plate precursor was found capable of providing excellent printing with no stains in the non-image areas even after 7,000 times printing and retaining excellent hydrophilicity and excellent in the durability to printing.

Example 6

Negative Type Heat Sensitive Planographic Printing Plate Precursor

Formation of Image Forming Layer

Using a similar support to that used in Example 5, the following coating solution 2 for an image forming layer was applied to the hydrophilic layer using a lot bar #15 so as to adjust the coating amount to be 1.0 g/m² after drying and dried at 80° C. for 2 minutes to form a negative type image forming layer and obtain a planographic printing plate precursor of Example 6.

Coating Solution 2 for an Image Forming Layer: Negative Type Image Formation Coating Solution

| copolymer (the weight average molecular weight of 60,000) having a composition of p-hydroxy-phenylmethacrylamide/2-hdyroxyethyl methacrylate/acrylonitrile/methyl methacrylate/methacrylic acid = 10/20/25/35/10 (ratio by weight) | 5.0 g |
| diazo compound having the following chemical formula (I) (the weight average molecular weight of 16,500) | 0.5 g |
| Victoria Pure Blue BOH | 0.1 g |
| cellulose ethyl ether | 0.2 g |
| tricresyl phosphate | 0.5 g |
| methyl cellosolve | 95 ml |
| water | 5 ml |

Diazo Compound (I)

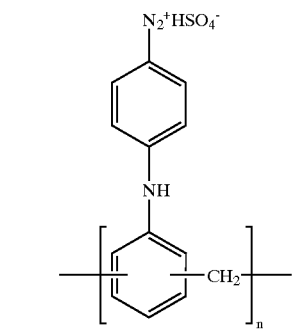

Through a step guide manufactured by Fuji Photo Film Co., Ltd., the obtained negative type planographic printing plate precursor was exposed for 50 seconds by a jet printer 2000 manufactured by Oak Seisakusho Co., Ltd. and then developed with the following development solution 1.

Next, when printing was carried out by a printing apparatus (trade name: SOR-M, manufactured by Hyderburg Co.), in the initial stage of the printing step, the image forming layer remaining in the non-image areas was removed and a high quality printing was obtained. When printing was continuously carried out thereafter, the planographic printing plate employing the support for a surface planographic printing plate of the invention was found capable of providing excellent printings in number of 6,000 with no stains in the non-image areas and accordingly, the planographic printing plate using the support of the invention was found excellent in the durability to printing and capable of retaining excellent hydrophilicity.

Development Solution 1

| benzyl alcohol | 30 ml |
| sodium carbonate | 5 g |
| sodium sulfite | 5 g |
| sodium dodecylbenzenesulfonate | 10 g |
| water | 1 L |

Example 7

Positive Type Planographic Printing Plate Precursor

A support 2 for planographic printing plate was obtained by forming a hydrophilic layer using the hydrophilic coating solution composition 1 in the same manner as Example 1, except that a biaxially extended polyethylene terephthalate film (trade name: A4100, manufactured by Toyobo Co., Ltd.) with a film thickness of 188 μm and subjected to corona treatment was used as a support.

The contact angle of the hydrophilic layer surface of the hydrophilic layer surface of the obtained support 1 for a planographic printing plate to air water droplets was measured by a measurement apparatus (trade name: CA-Z, manufactured by Kyowa Interface Science Co., Ltd.) to find that the contact angle was 9.0° and the support had excellent hydrophilicity.

To the above-mentioned hydrophilic layer, the following positive type coating solution for an image forming layer was applied using a lot bar #15 so as to adjust the coating amount to be 1.0 g/m$^2$ after drying and dried at 80° C. for 2 minutes to form a positive image forming layer and obtain a planographic printing plate precursor of Example 7.

Coating Solution 1 for Positive Type Image Forming Layer: Sulfonic Acid Ester-Based

| | |
|---|---|
| polysytyrenesulfonic acid cyclohexyl ester | 0.40 g |
| IR absorptive dye I | 0.05 g |
| methyl ethyl ketone | 4.00 g |

Evaluation of Planographic Printing Plate Precursor

Imagewise exposure was carried out for the obtained positive type planographic printing plate precursor under the conditions of outer face drum rotation speed of 100 rpm, the plate face energy of 300 mJ/m$^2$, and resolution degree of 2,400 dpi using an exposing apparatus (trade name: Trend Setter 3244 VFS, manufactured by CREO Co., Ltd.) equipped with water-cooling type 40 W IR semiconductor laser. Without being subjected to the development treatment, the exposed precursor was installed in a printing apparatus (trade name: SOR-M, manufactured by Hyderburg Co.) and printing was started as it was. Dampening water (trade names: IF201 (2.5%) and IF 202 (0.75%), both produced by Fuji Photo Film Co., Ltd.) and ink (trade name: GEOS-G Ink, produced by Dainippon Ink and Chemicals, Incorporated) were used.

In the initial stage of the printing step, the image forming layer remaining in the non-image areas was removed and a high quality printing was obtained. When printing was continuously carried out thereafter, the planographic printing plate precursor was found capable of providing excellent printing with no stains in the non-image areas even after 6,000 times printing and even in the case the PET film was used for the substrate of the support similarly to the case of using the aluminum substrate, it was found that excellent hydrophilicity was retained and excellency in the durability to printing was provided.

Example 8

A support 3 for a surface planographic printing plate was obtained in the same manner as Example 5, except that the above-mentioned hydrophilic graft polymer (2) was used for the hydrophilic coating solution composition 1 in place of the hydrophilic graft polymer (1).

The contact angle of the hydrophilic layer surface of the support 3 for a surface planographic printing plate (to air water droplets) was measured in the same manner as Example 1 to find that the contact angle was 8.5° and the support had excellent hydrophilicity.

A positive type image forming layer was formed on the obtained support 3 for a surface planographic printing plate in the same manner as Example 5 to obtain a planographic printing plate precursor of Example 8.

The obtained positive type planographic printing plate precursor was subjected to the printing evaluation by carrying out imagewise exposure by the same method of Example 5.

In the initial stage of the printing step, the image forming layer remaining in the non-image areas was removed and a high quality printing was obtained. When printing was continuously carried out thereafter, the planographic printing plate using the support for a surface planographic printing plate of the invention was found capable of providing excellent printing with no stains in the non-image areas even after 7,000 times printing and retaining excellent hydrophilicity and excellent in the durability to printing.

Example 9

A support 4 for a surface planographic printing plate was obtained in the same manner as Example 5, except that the above-mentioned hydrophilic graft polymer (3) obtained by the above-mentioned Synthesis example 3 was used for the hydrophilic coating solution composition 1 in place of the hydrophilic graft polymer (1).

The contact angle of the hydrophilic layer surface of the support 3 for a surface planographic printing plate (to air water droplets) was measured in the same manner as Example 1 to find that the contact angle was 9.5° and the support had excellent hydrophilicity.

A positive type image forming layer was formed on the obtained support 4 for a surface planographic printing plate in the same manner as Example 5 to obtain a planographic printing plate precursor of Example 9.

The obtained positive type planographic printing plate precursor was subjected to the printing evaluation by carrying out imagewise exposure by the same method of Example 5.

In the initial stage of the printing step, the image forming layer remaining in the non-image areas was removed and a high quality printing was obtained. When printing was continuously carried out thereafter, the planographic printing plate using the support for a surface planographic printing plate of the invention was found capable of providing excellent printing with no stains in the non-image areas even after 7,000 times printing and retaining excellent hydrophilicity and excellent in the durability to printing.

According to the invention, a hydrophilic member comprising a hydrophilic layer on the surface of a variety of substrates and excellent in hydrophilicity and durability can be provided. Further, an innovative hydrophilic graft polymer, which is a copolymer of a macromer having hydrophilic functional groups and a structural unit having silane coupling groups according to the invention, is useful for formation of the hydrophilic member.

What is claimed is:

1. A hydrophilic member for use with a base material including a surface, the member comprising:
    a hydrophilic surface disposed on the base material surface and including a hydrophilic graft chain and a cross-linked structure formed by hydrolysis and condensation polymerization of an alkoxide of a metal selected from Si, Ti, Zr, and Al; wherein,
    the hydrophilic surface includes a hydrophilic graft polymer, which is a copolymer of a macromer including a hydrophilic functional group and a structural unit having silane coupling group.

2. The hydrophilic member according to claim 1, wherein the alkoxide is Si alkoxide.

3. The hydrophilic member according to claim 1, wherein a molecular weight of the macromer is in a range from 400 to 100,000.

4. The hydrophilic member according to claim 1, wherein the silane coupling group is represented by the following general formula (I):

$$(R^1)_m(OR^2)_{3-m}\text{—Si—} \qquad \text{General formula (I)}$$

wherein, each of $R^1$ and $R^2$ independently represents one of a hydrogen atom and a hydrocarbon with no more than 8 carbon atoms; and m represents 0.

5. The hydrophilic member according to claim 1, wherein the hydrophilic surface comprises a hydrolyzable compound having the following general formula (II):

$$(R^6)_m\text{—X—}(OR^7)_{4-m} \qquad \text{General formula (II)}$$

wherein, each of $R^6$ and $R^7$ independently represents one of an alkyl and an aryl; X represents one of Si, Al, Ti, and Zr; and m represents an integer from 0 to 2.

6. A support for a planographic printing plate comprising:
a base material including a surface; and
a hydrophilic surface disposed on the base material surface and including a hydrophilic graft chain and a cross-linked structure formed by hydrolysis and condensation polymerization of an alkoxide of a metal selected from Si, Ti, Zr, and Al; wherein,
the hydrophilic surface includes a hydrophilic graft polymer, which is a copolymer of a macromer including a hydrophilic functional group and a structural unit having a silane coupling group.

7. The support for a planographic printing plate according to claim 6, wherein the alkoxide is Si alkoxide.

8. The support for a planographic printing plate according to claim 6, wherein a molecular weight of the macromer is in a range from 400 to 100,000.

9. The support for a planographic printing plate according to claim 6, wherein the silane coupling group is represented by the following general formula (I):

$$(R^1)_m(OR^2)_{3-m}\text{—Si—} \qquad \text{General formula (I)}$$

wherein, each of $R^1$ and $R^2$ independently represents one of a hydrogen atom and a hydrocarbon with no more than 8 carbon atoms; and m represents 0.

10. The support for a planographic printing plate according to claim 6, wherein the hydrophilic surface comprises a hydrolyzable compound having the following general formula (II):

$$(R^6)_m\text{—X—}(OR^7)_{4-m} \qquad \text{General formula (II)}$$

wherein, each of $R^6$ and $R^7$ independently represents one of an alkyl and an aryl; X represents one of Si, Al, Ti, and Zr; and m represents an integer from 0 to 2.

11. A planographic printing plate precursor comprising:
a support including a base material comprising a surface; and
an image forming layer disposed on the support,
wherein the support includes a hydrophilic surface disposed on the base material surface and comprising a hydrophilic graft chain and a cross-linked structure formed by hydrolysis of an alkoxide of a metal selected from Si, Ti, Zr, and Al and condensation polymerization,
wherein the hydrophilic surface includes a hydrophilic graft polymer, which is a copolymer of a macromer comprising a hydrophilic functional group and a structural unit comprising a silane coupling group.

12. The planographic printing plate precursor according to claim 11, wherein the alkoxide is Si alkoxide.

13. The planographic printing plate precursor according to claim 11, wherein a molecular weight of the macromer is in a range from 400 to 100,000.

14. The planographic printing plate precursor according to claim 11, wherein the silane coupling group is represented by the following general formula (I):

$$(R^1)_m(OR^2)_{3-m}\text{—Si—} \qquad \text{General formula (I)}$$

wherein, each of $R^1$ and $R^2$ independently represents one of a hydrogen atom and a hydrocarbon with no more than 8 carbon atoms; and m represents 0.

15. The planographic printing plate precursor according to claim 11, wherein the hydrophilic surface comprises a hydrolyzable compound represented by the following general formula (II):

$$(R^6)_m\text{—X—}(OR^7)_{4-m} \qquad \text{General formula (II)}$$

wherein, each of $R^6$ and $R^7$ independently represents one of an alkyl and an aryl; X represents one of Si, Al, Ti, and Zr; and m represents an integer from 0 to 2.

* * * * *